US012342140B2

(12) United States Patent
Yoneda

(10) Patent No.: US 12,342,140 B2
(45) Date of Patent: Jun. 24, 2025

(54) SIGNAL PROCESSING DEVICE AND METHOD FOR REDUCING DOPPLER DISTORTION

(71) Applicant: SONY GROUP CORPORATION, Tokyo (JP)

(72) Inventor: Michiaki Yoneda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 109 days.

(21) Appl. No.: 18/004,250

(22) PCT Filed: Jun. 30, 2021

(86) PCT No.: PCT/JP2021/024669
§ 371 (c)(1),
(2) Date: Jan. 4, 2023

(87) PCT Pub. No.: WO2022/014325
PCT Pub. Date: Jan. 20, 2022

(65) Prior Publication Data
US 2023/0269535 A1 Aug. 24, 2023

(30) Foreign Application Priority Data
Jul. 14, 2020 (JP) ................................ 2020-120706

(51) Int. Cl.
*H04R 3/08* (2006.01)
*H04R 29/00* (2006.01)

(52) U.S. Cl.
CPC ............. *H04R 3/08* (2013.01); *H04R 29/001* (2013.01)

(58) Field of Classification Search
CPC ...... H04R 3/08; H04R 29/001; H04R 29/003; H03F 1/32
See application file for complete search history.

(56) References Cited

U.S. PATENT DOCUMENTS 5,438,625 A 8/1995 Klippel
5,600,718 A * 2/1997 Dent ..................... H04R 3/002 379/406.06
(Continued)

FOREIGN PATENT DOCUMENTS

JP 55-141892 A 11/1980
JP H0290894 A 3/1990
(Continued)

OTHER PUBLICATIONS

International Search Report and Written Opinion of PCT Application No. PCT/JP2021/024669, issued on Sep. 14, 2021, 08 pages of ISRWO.

*Primary Examiner* — Mark Fischer
(74) *Attorney, Agent, or Firm* — CHIP LAW GROUP

(57) ABSTRACT

The present technique relates to a signal processing device and method capable of reducing Doppler distortion. The signal processing device includes a displacement prediction unit that predicts displacement of a diaphragm of a speaker, in a case where the speaker plays back sound based on an audio signal in which a high-frequency signal and a low-frequency signal are mixed, based on the audio signal; and a correction unit that performs time direction correction on the audio signal by performing interpolation processing using at least three samples of the audio signal, based on the displacement obtained from the predicting and a correction time obtained based on an acoustic velocity.

11 Claims, 21 Drawing Sheets

(56) References Cited

U.S. PATENT DOCUMENTS

| | | | | |
|---|---|---|---|---|
| 5,680,450 | A * | 10/1997 | Dent | H04M 9/082 381/103 |
| 10,602,288 | B1 | 3/2020 | French | |
| 2004/0052313 | A1* | 3/2004 | Hovakimyan | H04L 27/368 375/296 |
| 2015/0124982 | A1* | 5/2015 | Berthelsen | H04R 29/001 381/59 |

FOREIGN PATENT DOCUMENTS

| | | | |
|---|---|---|---|
| JP | 2011109487 | A | 6/2011 |
| JP | 2012-029000 | A | 2/2012 |
| JP | 2019-140660 | A | 8/2019 |
| JP | 2020184755 | A | 11/2020 |

* cited by examiner

SIGNAL PROCESSING DEVICE AND METHOD FOR REDUCING DOPPLER DISTORTION

CROSS REFERENCE TO RELATED APPLICATIONS

This application is a U.S. National Phase of International Patent Application No. PCT/JP2021/024669 filed on Jun. 30, 2021, which claims priority benefit of Japanese Patent Application No. JP 2020-120706 filed in the Japan Patent Office on Jul. 14, 2020. Each of the above-referenced applications is hereby incorporated herein by reference in its entirety.

TECHNICAL FIELD

The present technique relates to a signal processing device, method, and program, and particularly relates to a signal processing device, method, and program capable of reducing Doppler distortion.

BACKGROUND ART

In music playback using speakers, for example, a phenomenon may occur in which high-frequency signals are affected by low frequency signals, causing the sound image localization to become indistinct or sound shaky.

Doppler distortion, in which the diaphragm of a speaker vibrates back and forth due to low frequency signals and the sound source position of the signal radiating from the diaphragm changes due to the diaphragm moving back and forth, can be given as one factor that causes this phenomenon. This is particularly marked in full-range speakers, which output low to high frequencies from a single diaphragm.

Accordingly, a technique has been proposed in which Doppler distortion is canceled out by controlling a clock oscillator with a twice-integrated signal and varying the delay time of the signal using a variable delay device (see PTL 1, for example).

A technique has also been proposed in which, in digital signal processing, non-linear distortion of a speaker is corrected by linearly predicting displacement of the speaker using a parameter of a displacement of 0 [mm] (see PTL 2, for example). With this technique, Doppler distortion is corrected using linear prediction of displacement used to correct non-linear distortion in the speaker.

CITATION LIST

[Patent Literature]
[PTL 1]
JP 1556673 B
[PTL 2]
U.S. Pat. No. 5,438,625

SUMMARY

Technical Problem

However, it has been difficult to sufficiently reduce Doppler distortion using the above-described techniques.

For example, in the technique described in PTL 1, integration is simply performed twice as the method for obtaining the movement (displacement) of the speaker diaphragm, but movement obtained through integration is often different from the actual movement of speaker displacement, which has the opposite effect of increasing distortion.

Additionally, with the technique described in PTL 2, phase modulation is performed by controlling the delay time as the method for correcting Doppler distortion, and linear interpolation is used to calculate the data between sample intervals in the control of the delay time of discrete signals.

In particular, Doppler distortion increases at 6 dB/Oct as the frequency of a high-frequency signal increases, but linear interpolation can produce large errors, and new distortion caused by such errors will arise in such cases. In addition, no consideration is given to time correction when the amount of displacement in the speaker diaphragm is large and exceeds a single sampling interval.

The present technique has been achieved in light of such circumstances, and is capable of reducing Doppler distortion.

Solution to Problem

A signal processing device according to one aspect of the present technique includes: a displacement prediction unit that predicts displacement of a diaphragm of a speaker, in a case where the speaker plays back sound based on an audio signal in which a high-frequency signal and a low frequency signal are mixed, based on the audio signal; and a correction unit that performs time direction correction on the audio signal by performing interpolation processing using at least three samples of the audio signal, based on the displacement obtained from the predicting and a correction time obtained based on an acoustic velocity.

A signal processing method or program according to one aspect of the present technique includes a signal processing device performing the following steps: predicting displacement of a diaphragm of a speaker, in a case where the speaker plays back sound based on an audio signal in which a high-frequency signal and a low frequency signal are mixed, based on the audio signal; and performing time direction correction on the audio signal by performing interpolation processing using at least three samples of the audio signal, based on the displacement obtained from the predicting and a correction time obtained based on an acoustic velocity.

In one aspect of the present technique, displacement of a diaphragm of a speaker is predicted, in a case where the speaker plays back sound based on an audio signal in which a high-frequency signal and a low frequency signal are mixed, based on the audio signal; and time direction correction is performed on the audio signal by performing interpolation processing using at least three samples of the audio signal, based on the displacement obtained from the predicting and a correction time obtained based on an acoustic velocity.

DESCRIPTION OF EMBODIMENTS

Hereinafter, embodiments to which the present technique is applied will be described with reference to the drawings.

First Embodiment

<Present Technique>

The present technique reduces Doppler distortion by performing correction which shifts an audio signal in the time direction through interpolation processing using a polynomial expression of the second order or higher. The present technique is also capable of improving the accuracy of predicting actual movement in a speaker diaphragm, and further reducing Doppler distortion, by performing non-linear prediction of displacement in the diaphragm.

When playing back sound such as music using a speaker, a phenomenon may occur in which high-frequency signals are affected by low frequency signals, causing the sound image localization to become indistinct or sound shaky, and Doppler distortion is one factor that causes this phenomenon.

Figure 1:
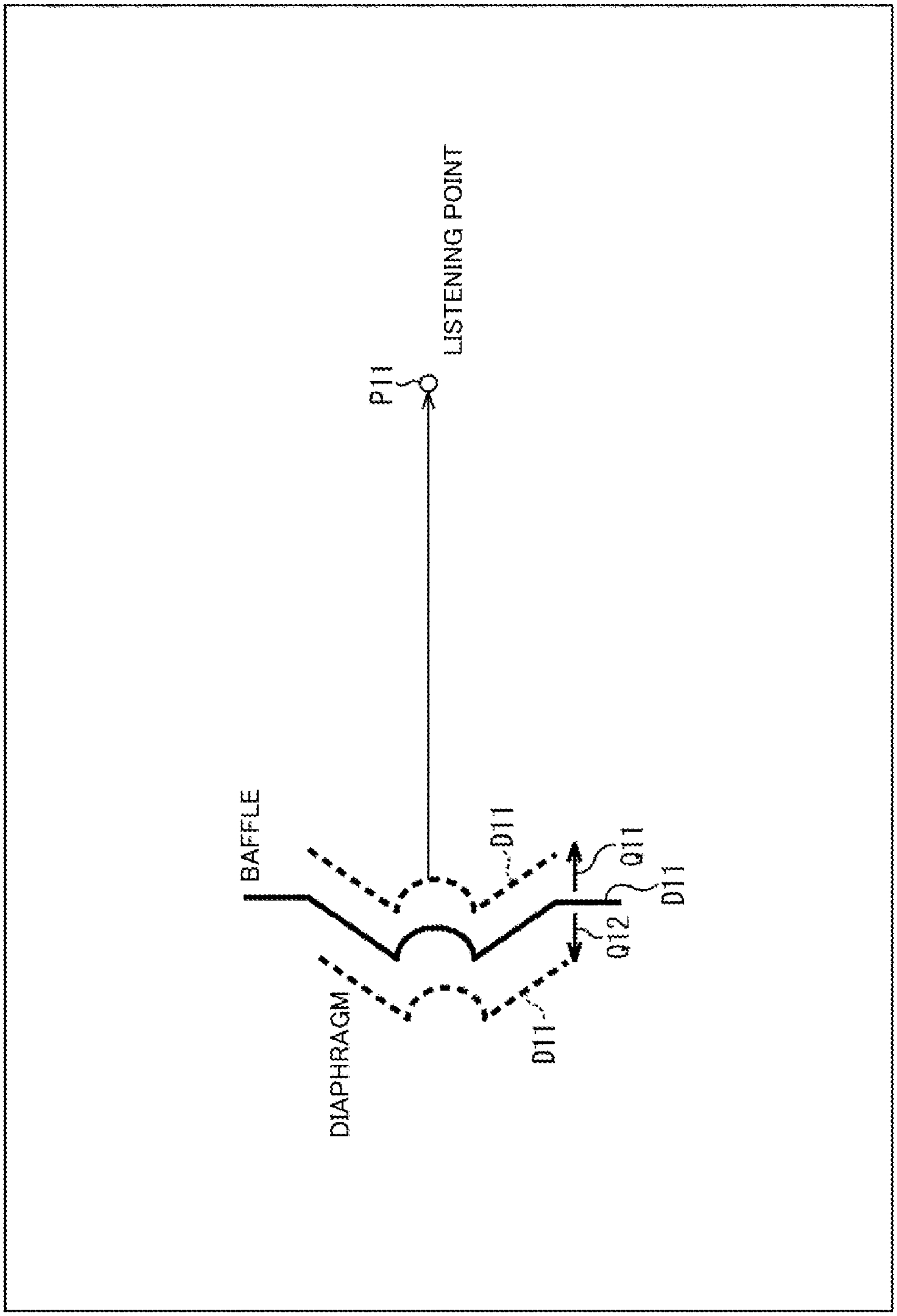
FIG. 1 is a diagram illustrating Doppler distortion.

As illustrated in FIG. 1, for example, Doppler distortion arises due to changes in the sound source position of a signal radiated from a diaphragm D11 of a speaker, which are caused by the diaphragm D11 vibrating back and forth due to low frequency signals.

Specifically, for example, if the diaphragm D11 moves forward as indicated by arrow Q11 in FIG. 1, i.e., in the direction of a listening point P11, the sound source position, i.e., the position where sound waves are generated, moves forward, and the phase of the sound (signal) output by diaphragm D11 advances forward. As a result, the wavelength of the sound output from the diaphragm D11 becomes shorter.

Conversely, if the diaphragm D11 moves backward as indicated by arrow Q12, i.e., in the direction opposite from the listening point P11, the sound source position moves backward, and the phase of the sound (signal) output by the diaphragm D11 is delayed. As a result, the wavelength of the sound output from the diaphragm D11 becomes longer.

In this manner, when a high-frequency signal (sound) is output from the diaphragm D11 while the diaphragm D11 is moving back and forth due to a low-frequency signal, the wavelength of the sound changes.

This phenomenon is called "Doppler distortion", and Doppler distortion is particularly marked in full-range speakers, which output low to high frequencies from a single diaphragm.

Full-range speakers are often used in what is known as normal two-channel stereo playback, 5.1-channel surround sound, sound Augmented Reality (AR) and Virtual Reality (VR) using multiple speakers, and wavefront synthesis, in order to treat the speaker as an ideal point sound source.

Doppler distortion in speakers affects the position, volume, and the like of the intended sound source and the sound source that is actually played back.

Figure 2:
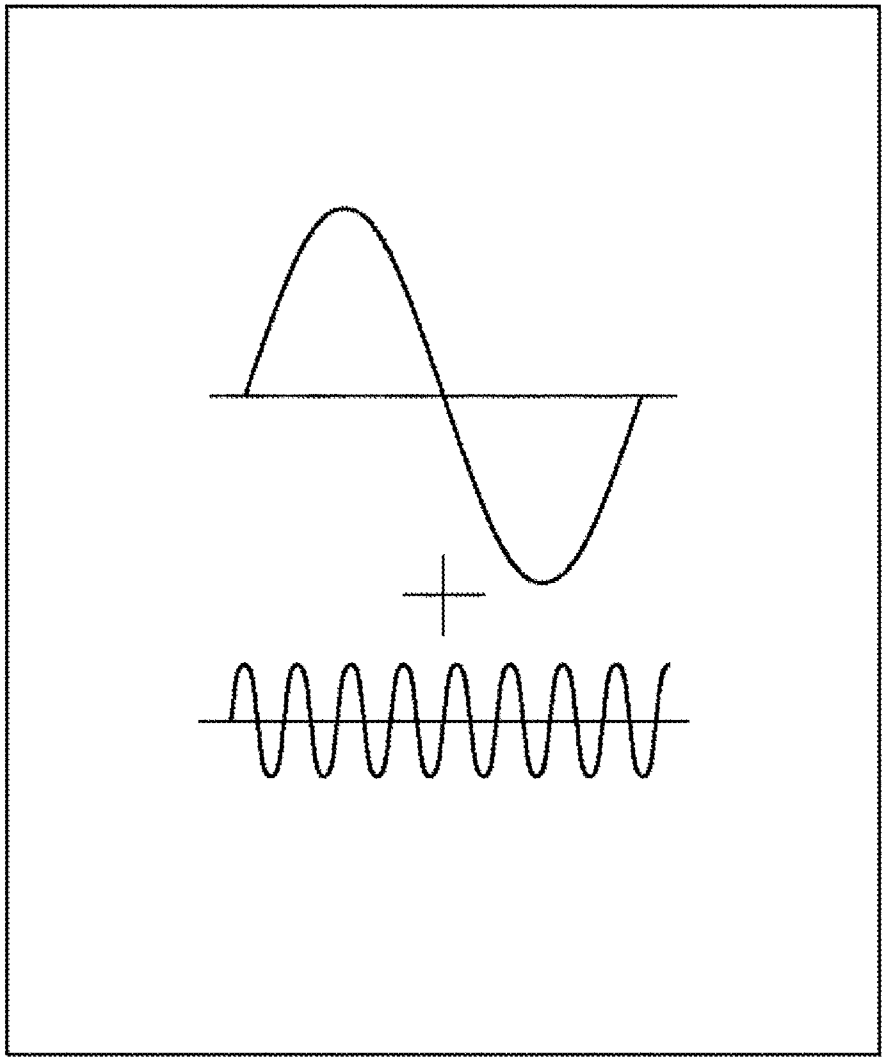
FIG. 2 is a diagram illustrating Doppler distortion.

Doppler distortion occurs, for example, when a low frequency signal and a high-frequency signal are played back simultaneously, as illustrated in FIG. 2.

In other words, as described above, the low frequency signal causes the diaphragm of the speaker to vibrate back and forth, which changes the sound source position of the high-frequency signal, and this in turn changes the arrival time of the sound to the listening point. This shortens or lengthens the wavelength of the high-frequency signal (sound), which causes the signal to distort.

Figure 3:
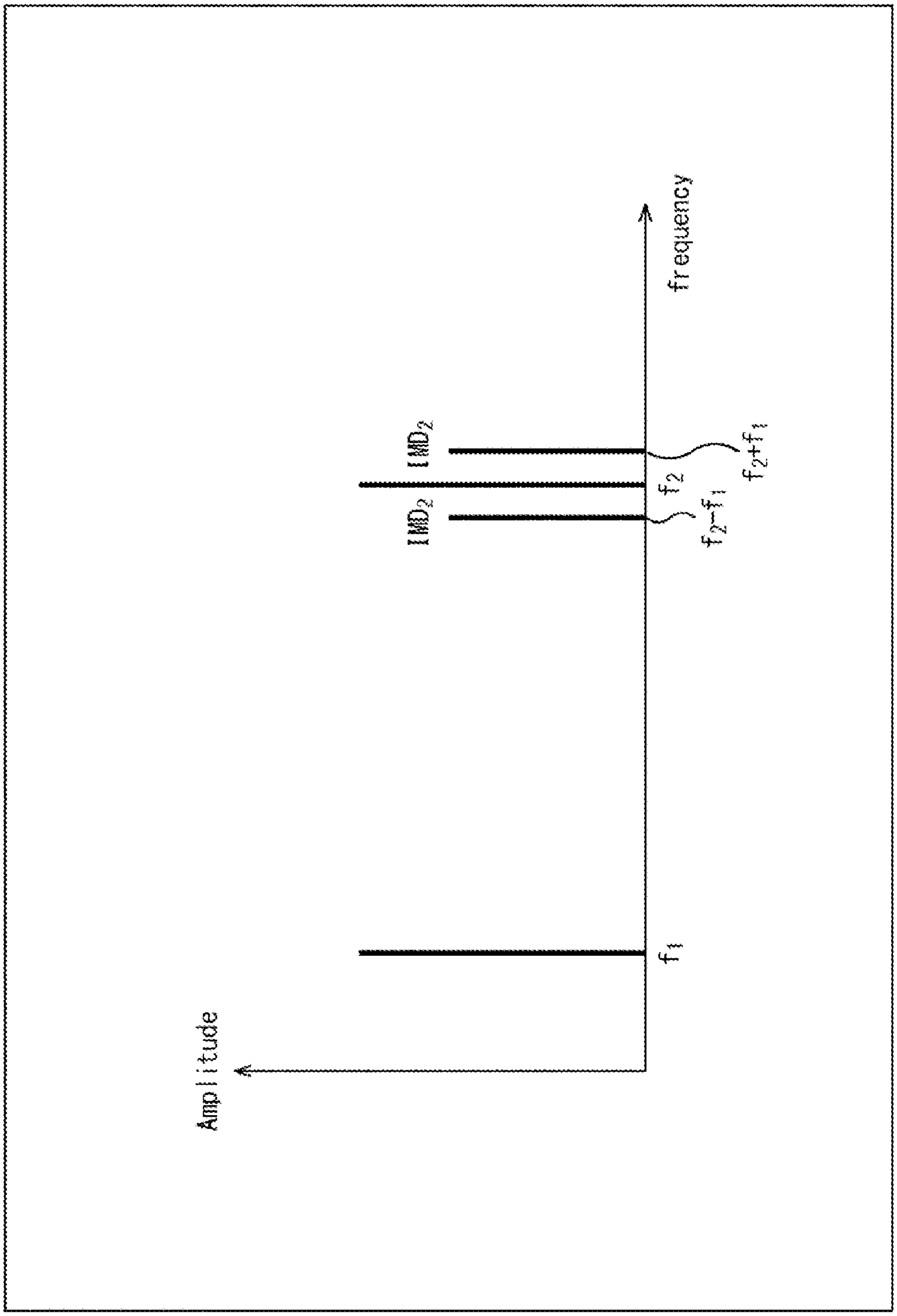
FIG. 3 is a diagram illustrating Doppler distortion.

For example, when low- and high-frequency signals output simultaneously when Doppler distortion arises are viewed on the frequency axis, the situation is as illustrated in FIG. 3. Note that in FIG. 3, the vertical axis represents the amplitude of the signal, and the horizontal axis represents the frequency.

In this example, the component of a frequency $f_1$ is the low-frequency signal component, and the component of a frequency $f_2$ is the high-frequency signal component. In particular, the low-frequency signal and the high-frequency signal are both considered sine wave signals here.

In this example, the low frequency signal and the high-frequency signal are output from the speaker simultaneously, resulting in Doppler distortion. In other words, here, a frequency $(f_2-f_1)$ component and a frequency $(f_2+f_1)$ component, which are frequency components in the side band, are signal components produced by Doppler distortion.

A method of predicting back-and-forth movement (displacement) of the speaker diaphragm and using the predicted displacement to control the delay time so as to invert with respect to the back-and-forth movement of the speaker diaphragm is conceivable as a method for reducing the Doppler distortion described above. In other words, as delay time control, control is performed to delay the timing of signal output (playback) by a time corresponding to the displacement of the diaphragm obtained by the prediction.

In this manner, the arrival time of sound to the listening point, which varies due to the speaker diaphragm moving back and forth, is controlled to be uniform, which makes it possible to reduce Doppler distortion.

Based on the above, to cancel Doppler distortion, the movement of the speaker diaphragm may be obtained through prediction or actual measurement, and time correction for the signal may be made in the reverse direction by an amount equivalent to the change in the arrival time of the sound (signal) caused by the movement.

However, it has been difficult to sufficiently reduce Doppler distortion using the current and proposed techniques.

Another method has been proposed for reducing Doppler distortion by modifying the shape of the diaphragm of the speaker. For example, a method has been proposed for reducing Doppler distortion by making the diaphragm shape a non-circular shape, such as an asymmetrical ellipse, such that higher frequency signals are radiated non-uniformly from the diaphragm and phase modulation is dispersed. However, even with such a method, the improvement in Doppler distortion was small, and could not be said to be sufficient.

Accordingly, with the present technique, Doppler distortion can be reduced by performing non-linear prediction to predict the movement (displacement) of the speaker diaphragm with higher accuracy, and time-correcting the audio signal through interpolation processing using a polynomial expression of the second order or higher.

For example, the displacement of the speaker can be predicted more accurately by performing non-linear prediction than linear prediction. Additionally, if interpolation processing is performed using a polynomial expression of the second order or higher, the interpolation can be performed more accurately than if linear interpolation is performed at two points. This makes it possible to reduce Doppler distortion more.

<Example of Configuration of Audio Playback System>

Figure 4:
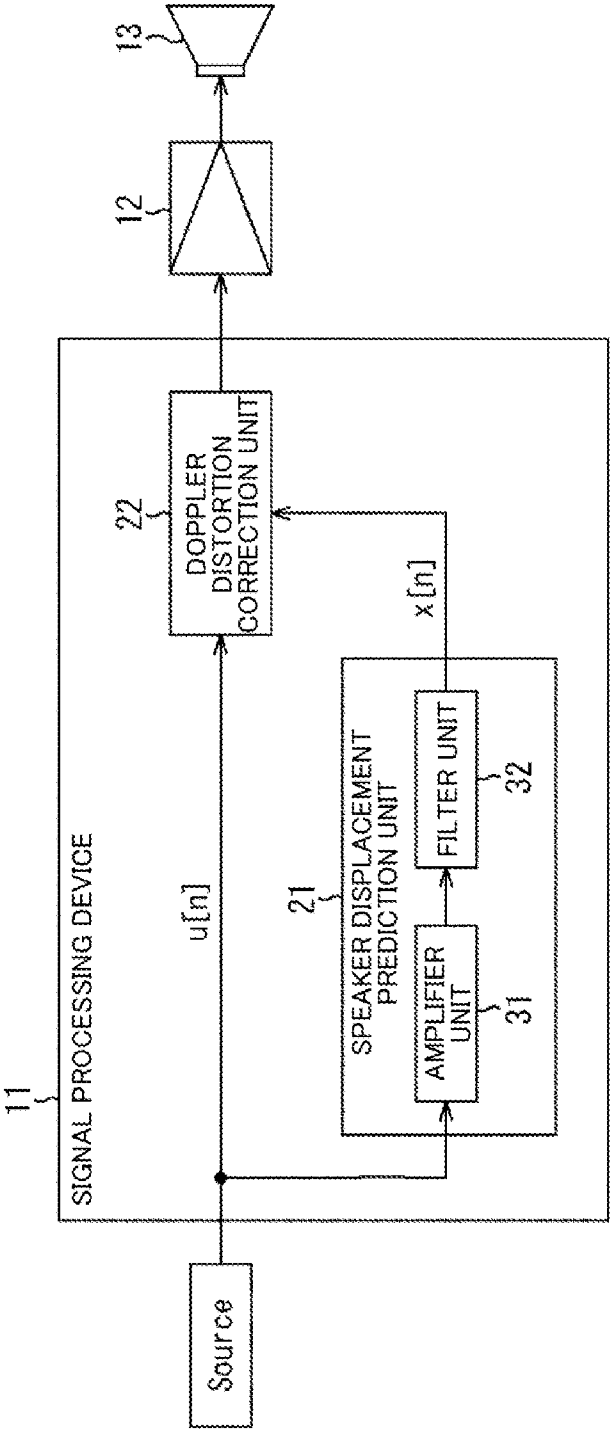
FIG. 4 is a diagram illustrating an example of the configuration of an audio playback system.

FIG. 4 is a diagram illustrating an example of the configuration of an embodiment of an audio playback system to which the present technique is applied.

The audio playback system illustrated in FIG. 4 includes a signal processing device 11, an amplifier unit 12, and a speaker 13.

The signal processing device 11 performs correction for reducing Doppler distortion on an audio signal of content to be played back or the like, and a corrected audio signal obtained as a result is supplied to the amplifier unit 12.

In the following, the audio signal input to the signal processing device 11, i.e., a source signal of the sound to be played back, will also be referred to particularly as an "input audio signal". Additionally, the correction for reducing Doppler distortion will also be referred to as "Doppler distortion correction" hereinafter.

The input audio signal input to the signal processing device 11 is an audio signal that contains a high-frequency component and a low frequency component, i.e., an audio signal containing a mixture of high-frequency signals and low-frequency signals.

The amplifier unit 12 amplifies the corrected audio signal supplied from the signal processing device 11 by an amplifier gain, which is a predetermined output voltage, and the amplified corrected audio signal is then supplied to the speaker 13 to drive the speaker 13.

The speaker 13 is constituted by, for example, a full-range speaker that outputs sound in a frequency band from low to high frequencies. Note that because Doppler distortion occurs in other speakers aside from full-range speakers, the speaker 13 is not limited to a full-range speaker, and may be any speaker.

The speaker 13 vibrates a diaphragm by driving the diaphragm based on the corrected audio signal supplied from the amplifier unit 12, and outputs sound based on the corrected audio signal.

The signal processing device 11 also includes a speaker displacement prediction unit 21 and a Doppler distortion correction unit 22.

Based on the input audio signal supplied, the speaker displacement prediction unit 21 predicts displacement of the speaker 13, and more specifically, predicts displacement of the diaphragm of the speaker 13, which is the target for correcting Doppler distortion, and supplies a prediction result to the Doppler distortion correction unit 22.

In other words, in the speaker displacement prediction unit 21, the displacement of the diaphragm of the speaker 13 when sound is played back by the speaker 13 based on the input audio signal is obtained by non-linear prediction based on the input audio signal. In particular, in the speaker displacement prediction unit 21, non-linear prediction is performed using a polynomial approximation (an approximate polynomial), and the displacement of the speaker 13 is obtained.

The speaker displacement prediction unit 21 includes an amplifier unit 31 and a filter unit 32.

The amplifier unit 31 amplifies the supplied input audio signal by the output voltage (the amplifier gain) at the amplifier unit 12 and supplies the amplified signal to the filter unit 32.

The filter unit 32 is constituted by, for example, a third-order Infinite Impulse Response (IIR) filter, performs non-linear prediction by filtering the input audio signal supplied from the amplifier unit 31, and supplies a displacement obtained as a prediction result to the Doppler distortion correction unit 22.

The Doppler distortion correction unit 22 performs Doppler distortion correction on the supplied input audio signal based on the prediction result supplied from the filter unit 32 of the speaker displacement prediction unit 21, and supplies a corrected audio signal obtained as a result to the amplifier unit 12.

Figure 5:
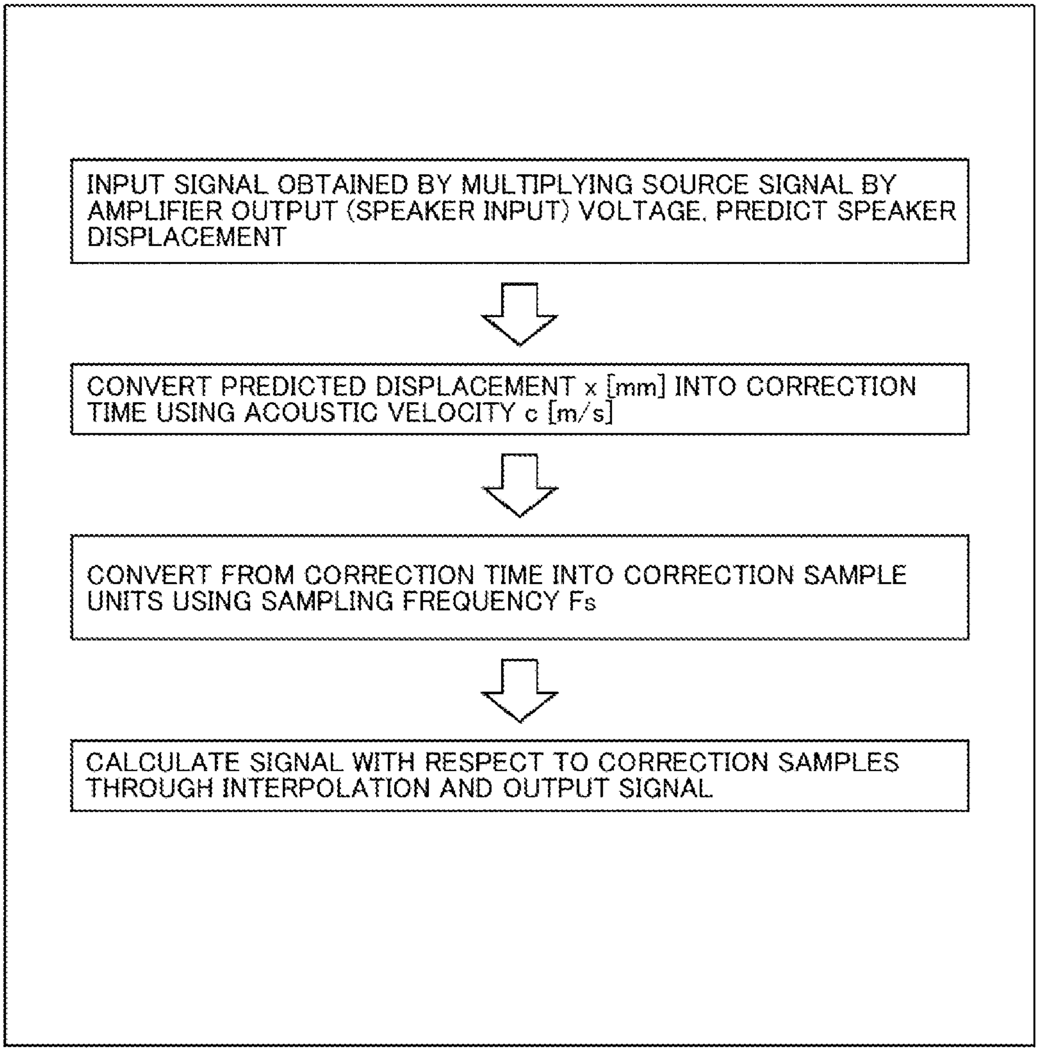
FIG. 5 is a diagram illustrating a flow of processing when correcting Doppler distortion.

In the signal processing device 11, the corrected audio signal is generated by performing processing roughly as illustrated in FIG. 5.

In other words, first, gain adjustment is performed in the amplifier unit 31 by multiplying the input audio signal (source signal) by the amplifier gain. This amplifier gain is a gain value used for amplification, i.e., gain adjustment, in the amplifier unit 12.

Next, in the filter unit 32, filtering is performed on the input audio signal after the gain adjustment, using a filter such as a third order IIR filter, for example.

This filtering processing is non-linear displacement prediction processing that predicts the displacement of the diaphragm of the speaker 13, and the prediction result obtained by such displacement prediction processing is supplied to the Doppler distortion correction unit 22. For example, a distance indicating the magnitude of the change in the position of the diaphragm, such as a displacement x [mm], is obtained as the prediction result for the displacement of the diaphragm.

In the Doppler distortion correction unit 22, the displacement x [mm] supplied as the prediction result is converted (transformed), based on an acoustic velocity c [m/s], into a correction time $d=x/c$ [s] corresponding to the displacement x [mm]. The correction time d indicates a delay time by which to delay the input audio signal.

For example, when the diaphragm of the speaker 13 moves forward, i.e. toward the listening point, the displacement x [mm] takes on a positive value. In such a case, the correction time d increases (takes on a positive value) to delay the timing of the output of sound by the speaker 13.

Conversely, when the diaphragm of the speaker 13 moves backward, i.e. in the direction opposite from the listening point, the displacement x [mm] takes on a negative value. In such a case, the correction time d decreases (takes on a negative value) to advance the timing of the output of sound by the speaker 13.

Additionally, in the Doppler distortion correction unit 22, the correction time d [s] is transformed (converted) into a time in sample units corresponding to the displacement x [mm], i.e., a correction sample number d×Fs [samples], based on a sampling frequency Fs of the input audio signal.

The correction sample number obtained in this manner indicates a correction amount for delaying or advancing the output timing of the input audio signal in the time direction in order to correct the Doppler distortion. In particular, the correction sample number also includes values below the decimal point.

Furthermore, in the Doppler distortion correction unit 22, the corrected audio signal is generated by performing correction for shifting the input audio signal in the time direction by the correction sample number (the correction amount) through interpolation processing based on the correction sample number and the input audio signal, i.e., by performing delay time correction processing.

In this case, as the delay time correction processing on the input audio signal, instead of linear interpolation between two points for samples below the decimal point, for example, the interpolation processing is performed using a polynomial expression of the second order or higher, such as Lagrange interpolation of the second order or higher, using at least three points, i.e., three or more samples of the input audio signal.

Through this interpolation processing using a polynomial expression of the second order or higher, the sample values of the input audio signal samples are corrected, which results in delay time correction processing that shifts the input audio signal in the time direction by the correction sample number.

In the Doppler distortion correction unit 22, in which such interpolation processing is performed, an offset of the delay time is prepared, taking into account the displacement amount by which the diaphragm of the speaker 13 moves back and forth and the sampling frequency of the input audio signal. This offset is a delayed sample number for which the output timing of the corrected audio signal is delayed as a whole, regardless of the Doppler distortion correction amount.

In the signal processing device 11, Doppler distortion correction is performed as described above. Such Doppler distortion correction corresponds to phase modulation on the input audio signal.

<Speaker Displacement Prediction>

The prediction of the displacement of the speaker 13 in the speaker displacement prediction unit 21 and the Doppler distortion correction in the Doppler distortion correction unit 22 will be described in further detail.

In the filter unit 32, the displacement of the speaker 13 when the input audio signal is input is predicted based on an equivalent model, i.e., an equivalent circuit, of the speaker 13. In other words, the prediction of the displacement of the speaker 13 is realized by digitally filtering the equivalent circuit of the speaker 13.

Figure 6:
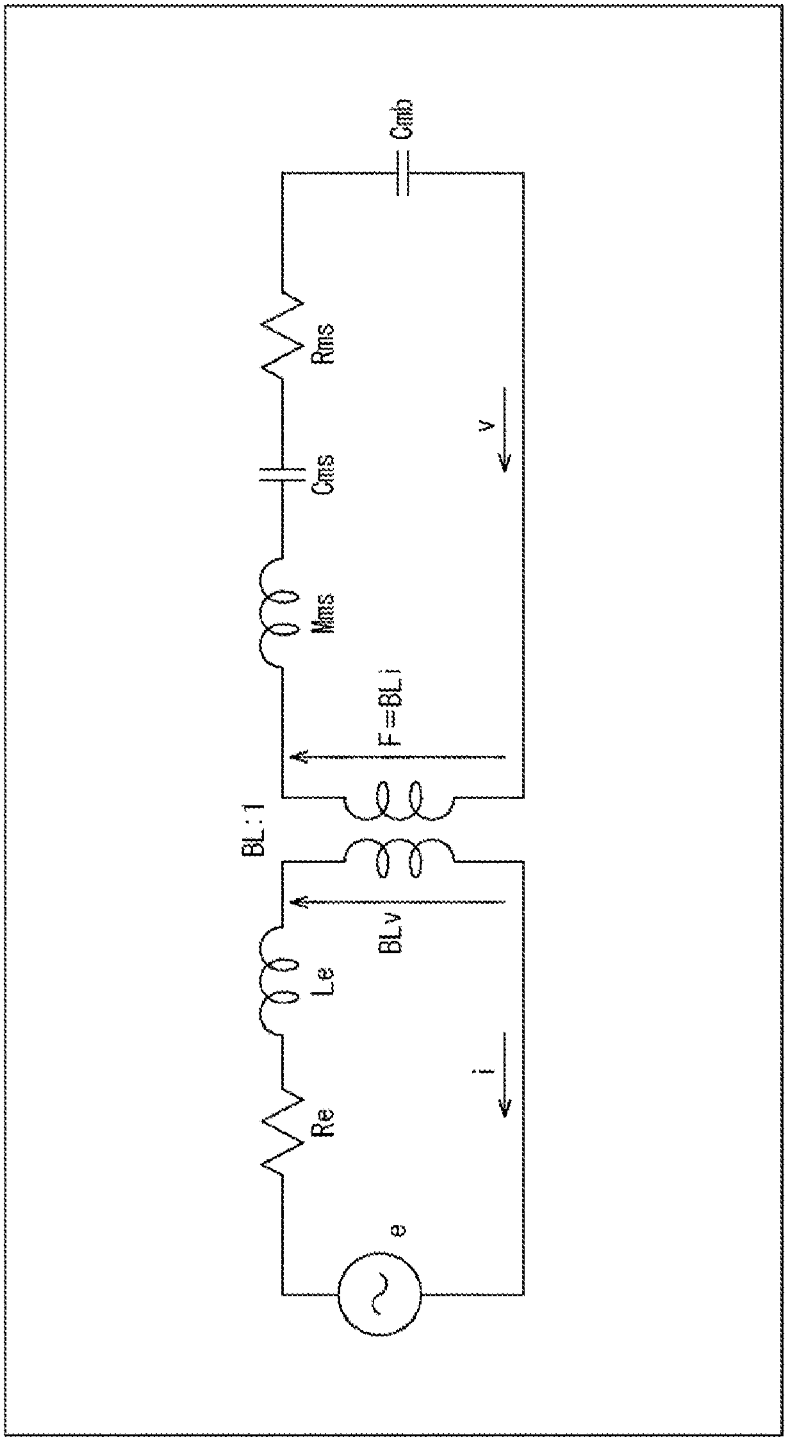
FIG. 6 is a diagram illustrating an example of an equivalent circuit of a speaker.

For example, if the speaker 13 is a sealed speaker, the equivalent circuit of that speaker 13 is as illustrated in FIG. 6.

In the example in FIG. 6, the circuit on the left side of the drawing indicates the equivalent circuit of the electrical system, and the right side of the drawing indicates the equivalent circuit of the mechanical system.

Also, each letter in FIG. 6 indicates each parameter, which will be called TS parameters.

In other words, "Re" indicates a DC resistance (Direct Current Resistance (DCR)) of the voice coil, "Le" indicates the inductance of the voice coil, and "BL" indicates a force coefficient, i.e., a BL value. The force coefficient BL is obtained from the product of the magnetic flux density in the voice coil and magnetic circuit parts unit and the coil length of the voice coil.

"Mms" indicates a vibration system equivalent mass, and this vibration system equivalent mass Mms is the mass of the diaphragm and the voice coil of the speaker 13.

"Cms" indicates the mechanical system compliance, which is an indicator of the softness of the suspension of the unit; "Rms" indicates the mechanical resistance of the suspension of the unit; and "Cmb" indicates the compliance due to the sealed suspension of the speaker 13, i.e., the sealed speaker.

The following will describe the prediction of displacement in the speaker 13 using these TS parameters.

A velocity v(s) of the diaphragm of the speaker can be expressed by the following Formula (1) using the TS parameters described above.

[Math. 1]

$$v(s) = \frac{Bl}{(\mathrm{Re} + Le \cdot s)\left(Mms \cdot s + \mathrm{Rms} + \frac{1}{Cms \cdot s} + \frac{1}{Cmb \cdot s}\right) + Bl^2} \tag{1}$$

A displacement X(s) of the diaphragm of the speaker is obtained by integrating the velocity v(s) and can therefore be expressed by the following Formula (2).

[Math. 2]

$$X(s) = \frac{v(s)}{S} \tag{2}$$

Accordingly, from Formulas (1) and (2) above, the displacement X(s) can be expressed by the following Formula (3) using the TS parameters.

[Math. 3]

$$X(s) = \frac{Bl}{(\mathrm{Re} + Le \cdot s)\left(Mms \cdot s^2 + \mathrm{Rms} \cdot s + \frac{1}{Cms} + \frac{1}{Cmb}\right) + Bl^2 \cdot s} \tag{3}$$

Such a displacement X(s) is an analog transfer function. This displacement X(s) is digitally filtered using a bilinear Z transform ($s=(1-Z^{-1})/(1+Z^{-1})$) or the like, and the displacement X(s), i.e., the analog transfer function can be expressed by the third-order IIR filter illustrated in FIG. 7 by obtaining the coefficients of the digital filter.

Figure 7:
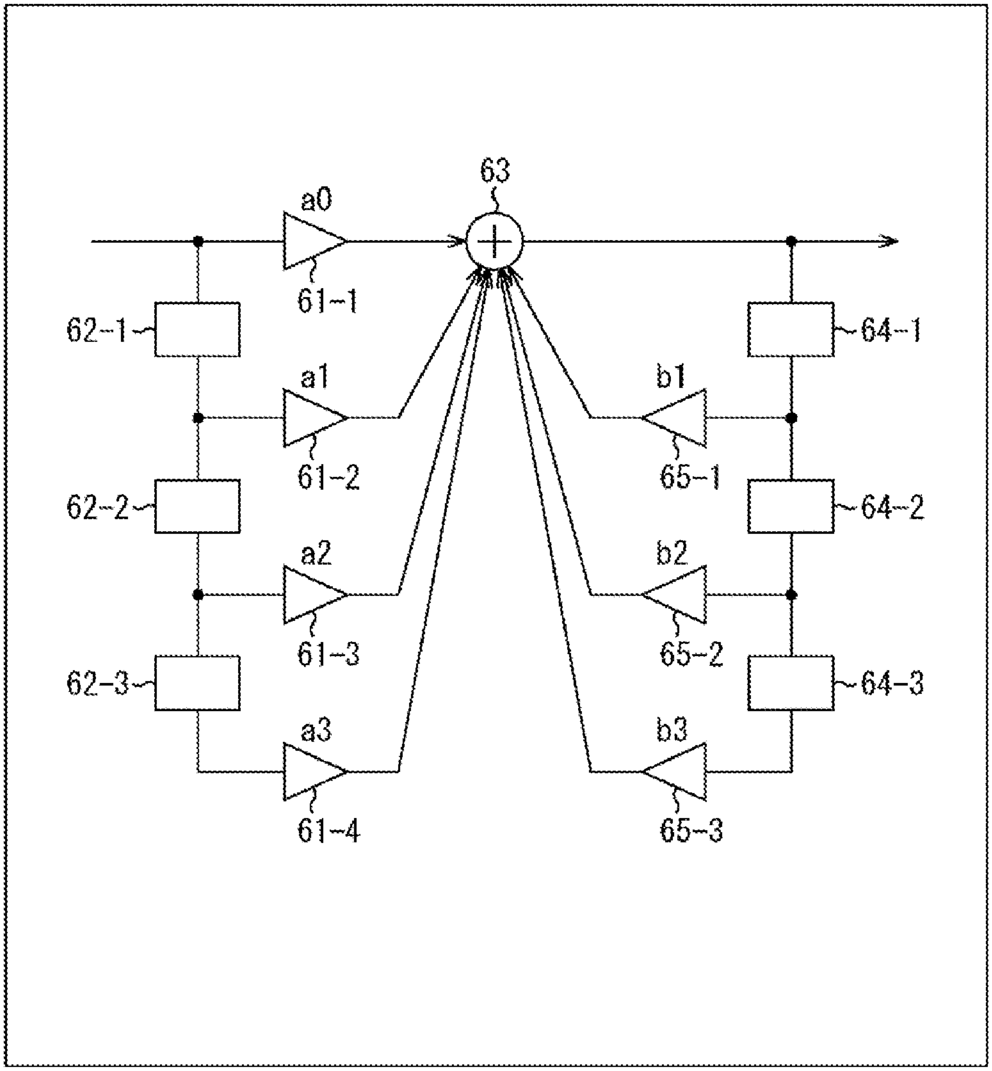
FIG. 7 is a diagram illustrating an example of the configuration of a third-order IIR filter.

In the example in FIG. 7, the third order IIR filter includes amplifier units 61-1 to 61-4, delay units 62-1 to 62-3, an adding unit 63, delay units 64-1 to 64-3, and amplifier units 65-1 to 65-3.

In this example, the signal to be processed is supplied to the amplifier unit 61-1 and the delay unit 62-1.

The amplifier unit 61-1 amplifies the supplied signal by multiplying the signal by a coefficient a0, and supplies the resulting signal to the adding unit 63. In addition, the delay unit 62-1 delays the supplied signal and supplies the delayed signal to the delay unit 62-2 and the amplifier unit 61-2.

The delay unit 62-2 delays the signal supplied from the delay unit 62-1 and supplies the resulting signal to the delay unit 62-3 and the amplifier unit 61-3, and the delay unit 62-3 delays the signal supplied from the delay unit 62-2 and supplies the resulting signal to the amplifier unit 61-4.

The amplifier units 61-2 to 61-4 amplify the signals supplied from the delay units 62-1 to 62-3 by multiplying the signals by coefficients a1 to a3, and supply the resulting signals to the adding unit 63.

Note that when there is no particular need to distinguish among the amplifier units 61-1 to 61-4, the amplifier units 61-1 to 61-4 may also be called simply "amplifier units 61" hereinafter. Additionally, when there is no particular need to distinguish among the delay units 62-1 to 62-3, the delay units 62-1 to 62-3 may also be called simply "delay units 62" hereinafter.

The adding unit 63 adds the signals supplied from the amplifier units 61-1 to 61-4 and the amplifier units 65-1 to 65-3, and supplies the signal obtained from the addition to the subsequent stage as the output of the third-order IIR filter as well as to the delay unit 64-1. The output of this adding unit 63 indicates the displacement of the speaker.

The delay unit 64-1 delays the signal supplied from the adding unit 63 and supplies the resulting signal to the delay unit 64-2 and the amplifier unit 65-1, and the amplifier unit 65-1 amplifies the signal supplied from the delay unit 64-1 by multiplying the signal by a coefficient b1 and supplies the amplified signal to the adding unit 63.

The delay unit 64-2 delays the signal supplied from the delay unit 64-1 and supplies the resulting signal to the delay unit 64-3 and the amplifier unit 65-2, and the delay unit 64-3 delays the signal supplied from the delay unit 64-2 and supplies the resulting signal to the amplifier unit 65-3.

The amplifier unit 65-2 and the amplifier unit 65-3 amplify the signals supplied from the delay unit 64-2 and the delay unit 64-3 by multiplying the signals by a coefficient b2 and a coefficient b3, and supply the resulting signals to the adding unit 63.

Note that when there is no particular need to distinguish among the delay units 64-1 to 64-3, the delay units 64-1 to 64-3 may also be called simply "delay units 64" hereinafter. Additionally, when there is no particular need to distinguish among the amplifier units 65-1 to 65-3, the amplifier units 65-1 to 65-3 may also be called simply "amplifier units 65" hereinafter.

For example, the coefficients a0 to a3 and the coefficients b1 to b3 used in the third-order IIR filter illustrated in FIG. 7 can be calculated by a bilinear transform. In other words, these coefficients can be calculated based on the TS parameters.

Figure 8:
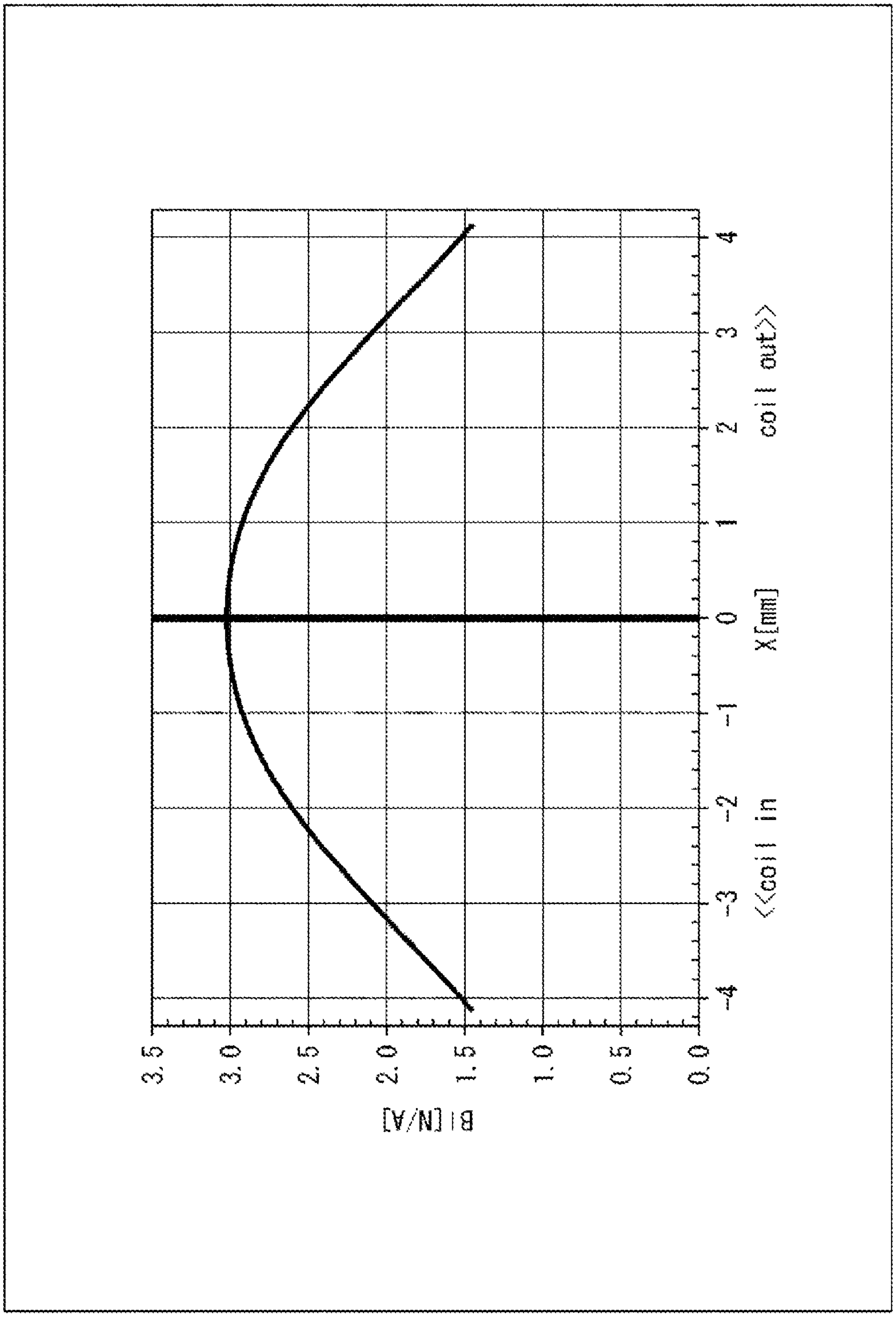
FIG. 8 is a diagram illustrating characteristics of a force coefficient with respect to speaker displacement.
Figure 9:
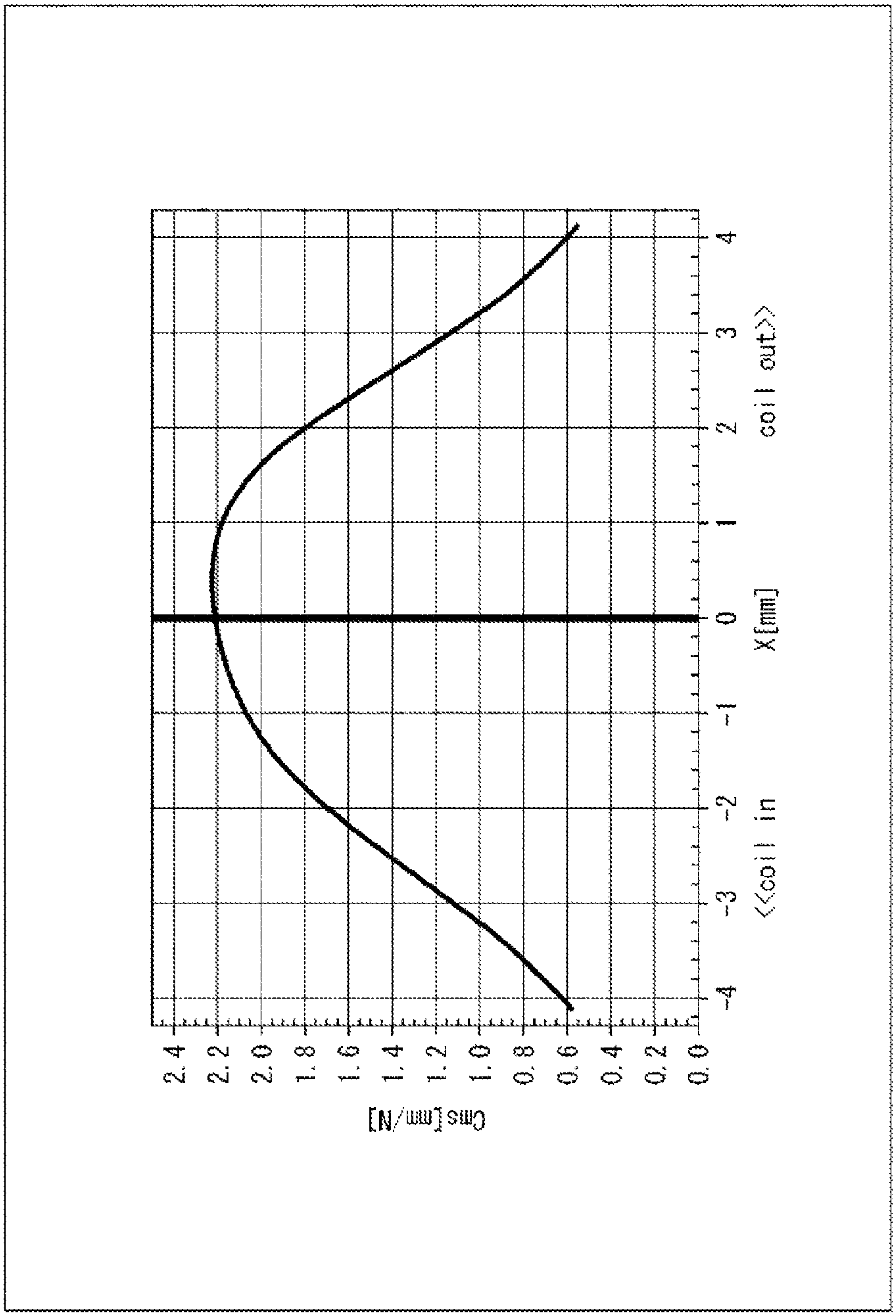
FIG. 9 is a diagram illustrating characteristics of mechanical system compliance with respect to speaker displacement.
Figure 10:
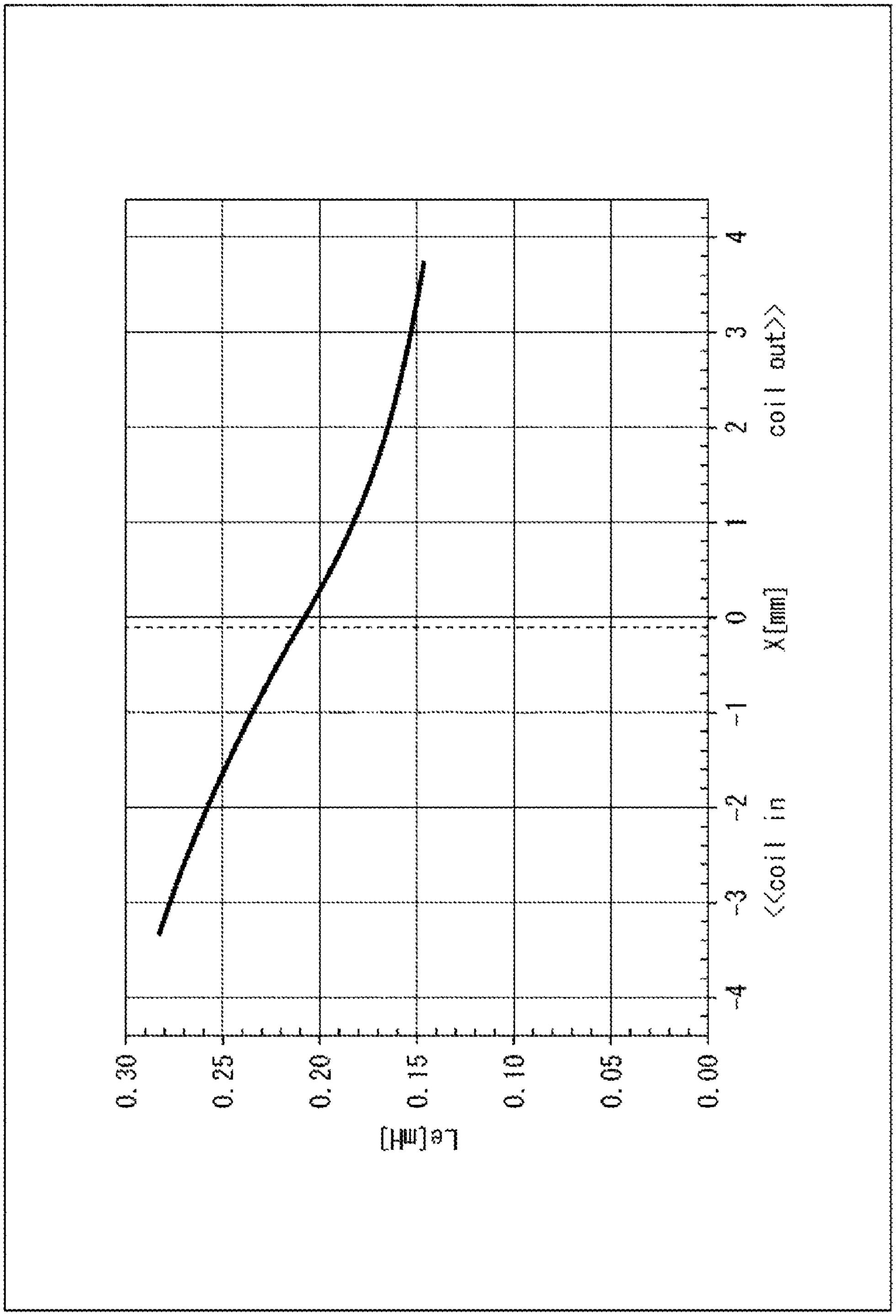
FIG. 10 is a diagram illustrating inductance characteristics with respect to speaker displacement.

Incidentally, among the TS parameters of the equivalent circuit of the speaker 13, the parameters of the speaker unit, i.e., the force coefficient BL, the mechanical system compliance Cms, and the inductance Le, vary non-linearly depending on the displacement x of the speaker 13, as illustrated in FIGS. 8 to 10, for example.

FIG. 8 illustrates the characteristics of the force coefficient BL of the speaker unit with respect to changes in the displacement x. That is, in FIG. 8, the vertical axis represents the force coefficient BL, and the horizontal axis represents the displacement x.

In this example, it can be seen that the force coefficient BL decreases non-linearly as the absolute value of the displacement x increases.

Additionally, FIG. 9 illustrates the characteristics of the mechanical system compliance Cms of the speaker unit with respect to changes in the displacement x. That is, in FIG. 9, the vertical axis represents the mechanical system compliance Cms, and the horizontal axis represents the displacement x.

In this example, similar to FIG. 8, it can be seen that the value of the mechanical system compliance Cms varies non-linearly with respect to the displacement x.

FIG. 10 illustrates the characteristics of the inductance Le of the speaker unit with respect to changes in the displacement x. That is, in FIG. 10, the vertical axis represents the inductance Le, and the horizontal axis represents the displacement x.

In this example, it can be seen that the inductance Le decreases non-linearly as the value of the displacement x increases.

In this manner, the force coefficient BL, the mechanical system compliance Cms, and the inductance Le vary non-linearly.

Accordingly, when predicting the displacement x including these non-linear elements, the non-linear parameters, i.e., the force coefficient BL, the mechanical system compliance Cms, and the inductance Le, may be obtained from the output displacement x. Then, the coefficients of the third-order IIR filter may be updated using those obtained non-linear parameters.

Figure 11:
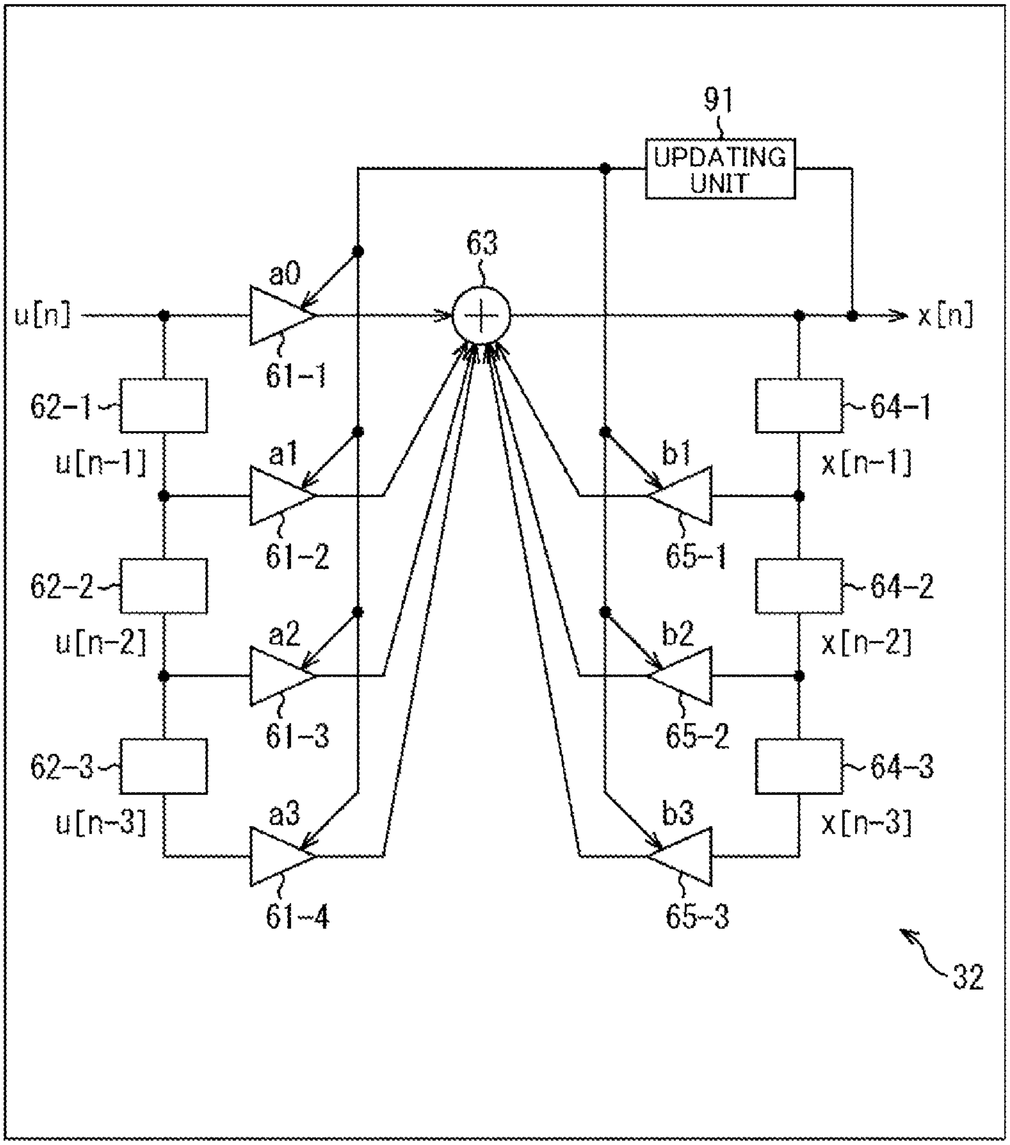
FIG. 11 is a diagram illustrating an example of the configuration of a third-order IIR filter.

In such a case, for example, if the filter unit 32 is constituted by a third-order IIR filter, the third-order IIR filter is configured as illustrated in FIG. 11. Note that in FIG. 11, parts corresponding to those in FIG. 7 are indicated by the same reference signs, and description of those parts will be omitted as appropriate.

The third-order IIR filter illustrated in FIG. 11 includes the amplifier units 61-1 to 61-4, the delay units 62-1 to 62-3, the adding unit 63, the delay units 64-1 to 64-3, the amplifier units 65-1 to 65-3, and an updating unit 91.

In the third-order IIR filter illustrated in FIG. 11, an input audio signal u [n], obtained by performing gain adjustment on the input audio signal using the amplifier gain, is supplied to the amplifier unit 61-1 and the delay unit 62-1 constituting the third-order IIR filter.

Note that "n" in the input audio signal u [n] indicates a sample, and in each of the delay units 62 and the delay units 64, the supplied signal is delayed by a time equivalent to one sample and output to the subsequent stage.

The updating unit 91 calculates the force coefficient BL [n], the mechanical system compliance Cms [n], and the inductance Le [n], which are used to obtain the displacement x [n] of the next sample, based on the displacement x [n−1] supplied from the adding unit 63.

For example, the force coefficient BL [n], the mechanical system compliance Cms [n], and the inductance Le [n] can be obtained by a fourth-order approximate polynomial as indicated in Formula (4) below.

[Math. 4]

$$Bl[n]=bl4*x[n-1]^4*+bl3*x[n-1]^3+bl2*x[n-1]^2+bl1*x[n-1]+bl0$$

$$Cms[n]=cms4*x[n-1]^4*+cms3*x[n-1]^3+cms2*x[n-1]^2+cms1*x[n-1]+cms0$$

$$Le[n]=le4*x[n-1]^4*+le3*x[n-1]^3+le2*x[n-1]^2+le1*x[n-1]+le0 \quad (4)$$

Note that in Formula (4), bl0 to bl4 represent the zeroth-order to fourth-order terms, respectively, in the approximate expression expressing the force coefficient BL. Similarly, cms0 to cms4 represent the zeroth order to fourth-order terms, respectively, in the approximate expression expressing the mechanical system compliance Cms, and le0 to le4 represent the zeroth-order to fourth-order terms, respectively, in the approximate expression expressing the inductance Le.

The updating unit 91 performs the calculation indicated in Formula (4), and based on the force coefficient BL [n], the mechanical system compliance Cms [n], and the inductance Le [n] obtained as a result, updates the coefficients a0 to a3 and the coefficients b1 to b3 described above. The updating unit 91 then supplies those updated coefficients to the amplifier units 61 and the amplifier units 65.

In this manner, by having the updating unit 91 calculate the force coefficient BL [n], the mechanical system compliance Cms [n], and the inductance Le [n] based on the immediately-previous displacement x [n−1], non-linear displacement prediction using an approximate polynomial is realized, which makes it possible to obtain a more accurate displacement x [n].

Here, a comparison between a prediction result and an actual value when, for a predetermined speaker 13, linear prediction and non-linear prediction of the displacement in the speaker 13 are performed, will be described with reference to FIGS. 12 and 13.

Figure 12:
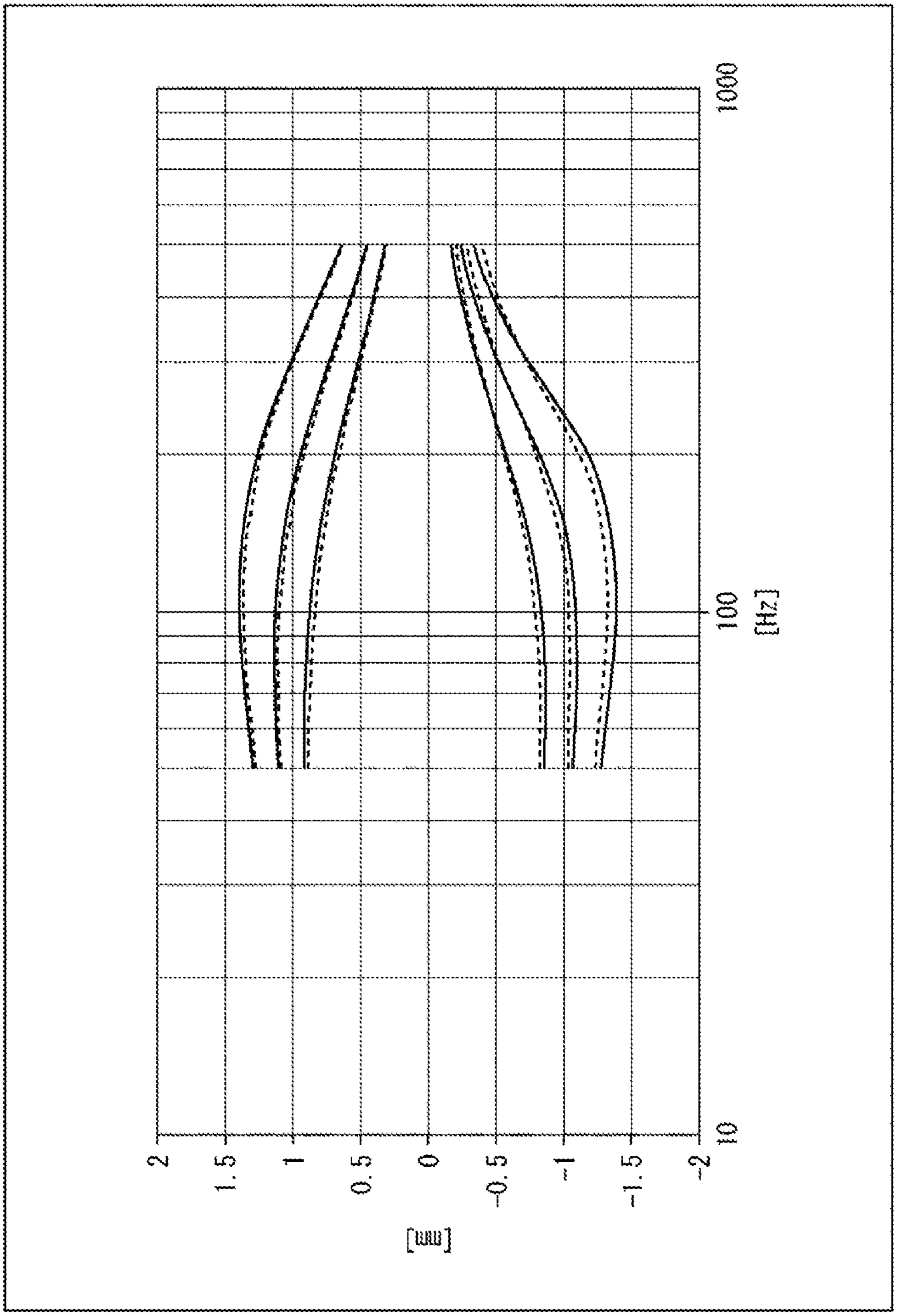
FIG. 12 is a diagram illustrating a prediction result when non-linear prediction is performed and an actual value of displacement.
Figure 13:
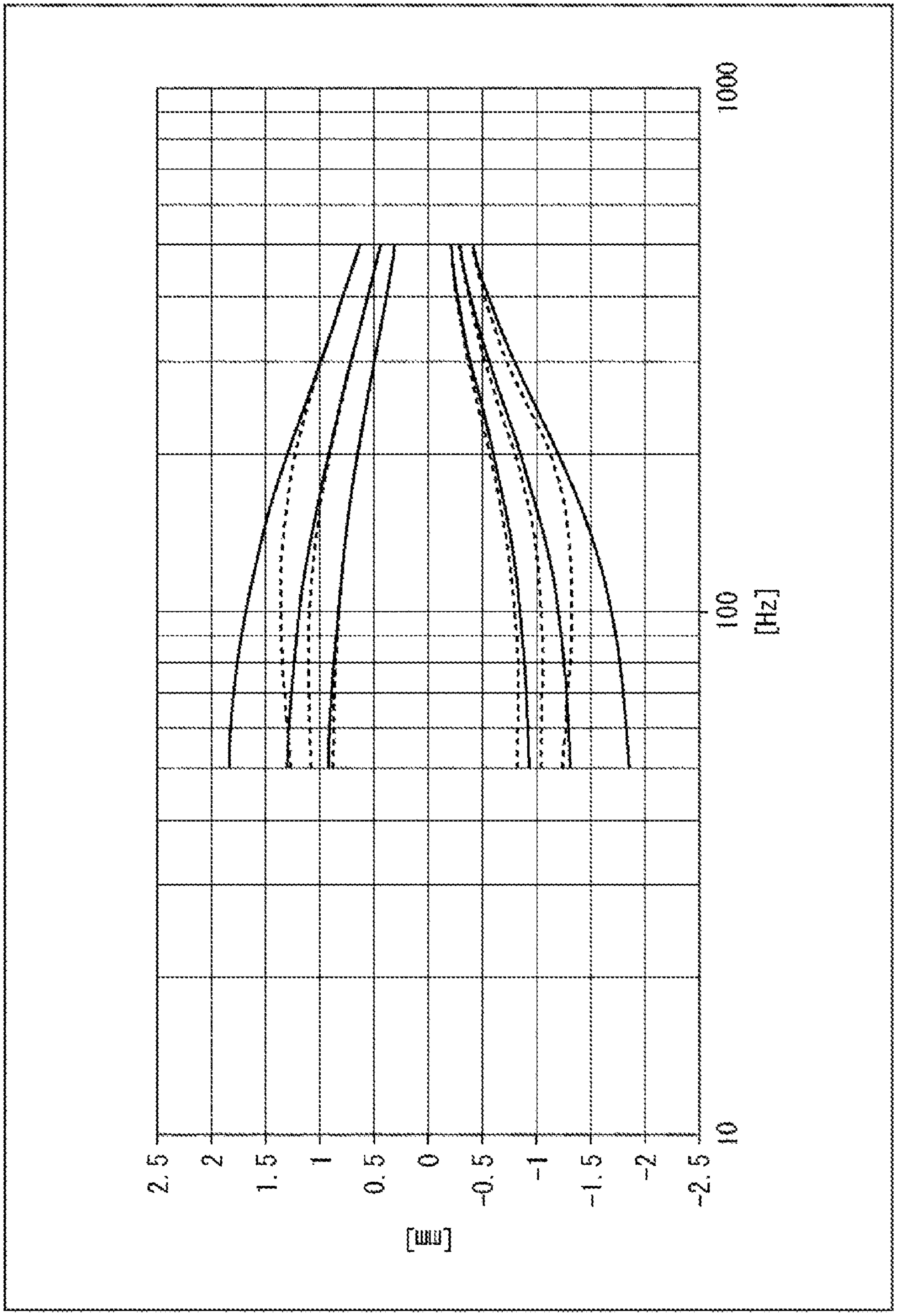
FIG. 13 is a diagram illustrating a prediction result when linear prediction is performed and an actual value of displacement.

Note that in FIGS. 12 and 13, the vertical axis represents the displacement x [n] of the speaker 13, and the horizontal axis represents the frequency of the signal input to the speaker 13. In particular, on the vertical axis in these drawings, positive values of the displacement x [n] represent displacement amounts toward the listening point, i.e., in the forward direction, and negative values represent displacement amounts in the backward direction.

FIG. 12 illustrates the prediction results of the displacement x [n] found through non-linear prediction, and the actual values. In particular, in FIG. 12, the solid line curves represent the prediction results found through non-linear prediction, and the dotted lines represent the actual values. In this example, the difference between the prediction results and the actual values (prediction error) is small regardless of the signal level, i.e., the displacement amount of the speaker 13, at each frequency, which shows that the displacement x [n] can be predicted with high accuracy.

In contrast, FIG. 13 illustrates the prediction results of the displacement x [n] found through linear prediction, and the actual values. In particular, in FIG. 13, the solid line curves represent the prediction results found through linear prediction, and the dotted lines represent the actual values. In this example, it can be seen that the force coefficient BL, the mechanical system compliance Cms, and the inductance Le of the speaker 13 (speaker unit) have a high degree of non-linearity, and that the prediction results and actual values diverge as the signal level, i.e., the displacement amount of the speaker 13, increases, resulting in an increase in prediction error.

From the above, it can be seen that for such a speaker 13 (speaker unit), non-linear prediction is necessary to reduce the prediction error of the displacement x [n].

Note that if the speaker 13 is used within a range in which the force coefficient BL, the mechanical system compliance Cms, and the inductance Le change little with respect to changes in the displacement x [n], the displacement x [n] may be obtained through linear prediction.

This corresponds to a case where, for example, a high-pass filter that cuts low frequencies of the input audio signal is provided in an early stage of this displacement prediction processing to attenuate the frequency band where the non-linearity of the displacement becomes large, and the speaker 13 is used mainly in a frequency band which is nearly linear.

The displacement x [n] may also be predicted linearly in the case where the force coefficient BL, the mechanical system compliance Cms, and the inductance Le have a low degree of non-linearity with respect to changes in the displacement x [n], and the speaker 13 is used in a linear region.

<Doppler Distortion Correction>

Next, Doppler distortion correction, i.e., time correction, on the input audio signal will be described.

Figure 14:
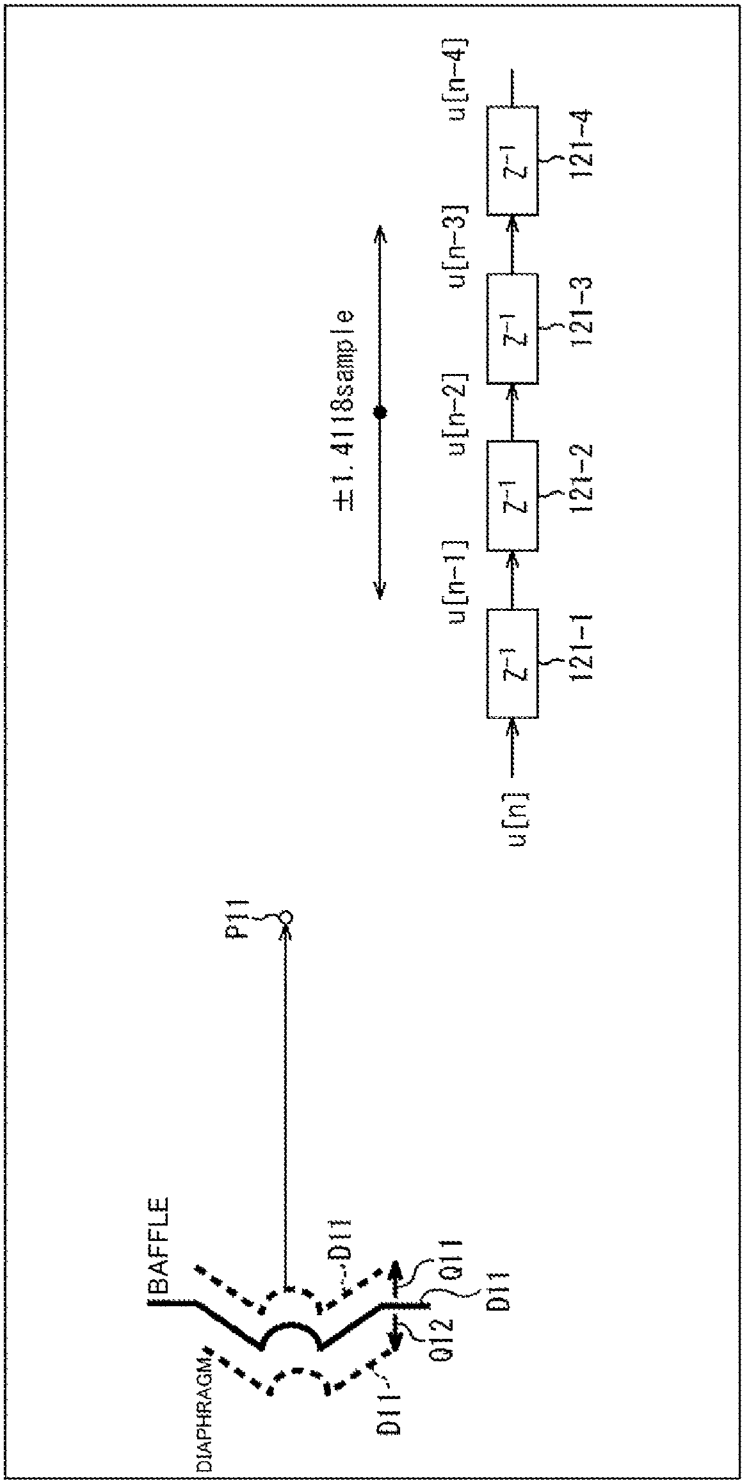
FIG. 14 is a diagram illustrating Doppler distortion correction.

For example, as illustrated on the left side of FIG. 14, the displacement x [n] is positive (plus) when the diaphragm D11 of the speaker 13 moves forward (toward the listening point P11). In this case, the arrival time of the sound (signal) output from the speaker 13 to the listening point P11 is shortened, and it is therefore necessary to delay the sound output time by the positive amount of the displacement x [n]. Note that in FIG. 14, parts corresponding to those in FIG. 1 are indicated by the same reference signs, and description of those parts will be omitted as appropriate.

On the other hand, the displacement x [n] is negative (minus) when the diaphragm D11 of the speaker 13 moves backward. In this case, the arrival time of the sound (signal) output from the speaker 13 to the listening point P11 is lengthened, and it is therefore necessary to advance the sound output time by the negative amount of the displacement x [n].

Therefore, to achieve Doppler distortion correction during playback, an offset using delay may be prepared for the amount of time by which the input audio signal is advanced, and as the Doppler distortion correction, time correction may be performed centered on the offset according to the amount of displacement (the displacement x [n]) of the speaker 13.

Here, the time correction performed as Doppler distortion correction is processing for obtaining, as the corrected audio signal, a signal in which the input audio signal is delayed or advanced in the time direction by an amount corresponding to the displacement x [n].

This processing can be said to be processing for obtaining a sample value of a sample to be processed in the signal resulting from delaying or advancing the input audio signal in the time direction by an amount corresponding to the displacement x [n], by performing interpolation processing based on the sample values of a plurality of samples of the input audio signal. In other words, the time correction performed as Doppler distortion correction can be said to be correction processing on an amplitude value of the input audio signal.

The offset can be obtained by converting the maximum displacement amount of the diaphragm D11 of the speaker 13 from distance to time using the acoustic velocity, and then converting to sample units using the sampling frequency.

Specifically, for example, assume that the maximum displacement amount of the diaphragm D11 of the speaker 13 is +10 [mm], and the sampling frequency Fs of the input audio signal is 48 [kHz].

In such a case, the maximum displacement amount of ±10 [mm] becomes ±29.4 [μs] when converted into time at the acoustic velocity c=340 [m/s], and further into ±1.4118 [sample] when ±29.4 [μs] is converted into sample units at the sampling frequency of 48 [kHz].

Accordingly, in such an example, the number of samples by which to offset the input audio signal is two samples, and a delay circuit constituted by four delay units 121-1 to 121-4, as illustrated on the right side of the drawing, may be prepared for a maximum of four samples, i.e., twice the offset.

The delay unit 121-1 delays the supplied input audio signal by a time equivalent to one sample and supplies the resulting signal to the delay unit 121-2.

In addition, the delay unit 121-2 and the delay unit 121-3 delay the input audio signal supplied from the delay unit 121-1 and the delay unit 121-2 by a time equivalent to one sample, and supply the resulting signals to the delay unit 121-3 and the delay unit 121-4, respectively. Similarly, the delay unit 121-4 delays the input audio signal supplied from the delay unit 121-3 by a time equivalent to one sample and outputs the resulting signal to the subsequent stage.

Note that when there is no particular need to distinguish among the delay units 121-1 to 121-4, the delay units 121-1 to 121-4 may also be called simply "delay units 121" hereinafter.

In the example illustrated on the right side of FIG. 14, providing a delay circuit for four samples makes it possible to cover a time variation from 0.5882 (=2−1.4118) samples to 3.4118 (=2+1.4118) samples, and enables time correction corresponding to changes in the displacement x [n] of the diaphragm D11 of the speaker 13.

As interpolation processing for obtaining signals at time sample points including values lower than the decimal point, which realizes such time correction, Lagrange interpolation, which is widely used in interpolation of oversampling filters in Digital to Analog Converters (DACs) such as with Compact Discs (CDs), can be used, for example.

Specifically, for example, Lagrange interpolation is used to include an offset corresponding to a displacement of 0 [mm] of speaker 13, and interpolation is performed using an (n−1) order polynomial expression with n or more points covering the maximum displacement amount of the speaker 13 (e.g., n=3), i.e., n samples or more.

As one example, assume that the maximum displacement amount of the diaphragm of the speaker 13 is +10 [mm], and the sampling frequency Fs of the input audio signal is 48 [kHz].

In this case, for example, as indicated by the following Formula (5), a corrected audio signal $u_d$ [n] in which the input audio signal u [n] is delayed or advanced by a time corresponding to the displacement x [n] can be obtained by performing interpolation processing through a fourth-order interpolation polynomial expression with five points (five samples) from an order n=0 to an order n=4.

[Math. 5]

$$u_d[n] = \frac{(x-1)(x-2)(x-3)(x-4)}{(0-1)(0-2)(0-3)(0-4)}u[n] + \frac{(x-0)(x-2)(x-3)(x-4)}{(1-0)(1-2)(1-3)(1-4)}u[n-1] + \frac{(x-0)(x-1)(x-3)(x-4)}{(2-0)(2-1)(2-3)(2-4)}u[n-2] + \frac{(x-0)(x-1)(x-2)(x-4)}{(3-0)(3-1)(3-2)(3-4)}u[n-3] + \frac{(x-0)(x-1)(x-2)(x-3)}{(4-0)(4-1)(4-2)(4-3)}u[n-4] = \frac{(x-1)(x-2)(x-3)(x-4)}{24}u[n] + \frac{(x-0)(x-2)(x-3)(x-4)}{-6}u[n-2] + \frac{(x-0)(x-1)(x-3)(x-4)}{4}u[n-2] + \frac{(x-0)(x-1)(x-2)(x-4)}{-6}u[n-3] + \frac{(x-0)(x-1)(x-2)(x-3)}{24}u[n-4] \quad (5)$$

Note that in Formula (5), x indicates a correction sample number, which is the correction time per sample unit corresponding to the displacement x [n]. Although an example of using Lagrange interpolation as the interpolation processing is described here, the interpolation processing is not limited thereto, and any interpolation processing can be used as long as it is interpolation processing using a polynomial expression of the second order or higher, such as Newton's interpolation or spline interpolation.

If sound is played back by the speaker 13 based on the corrected audio signal generated by the Lagrange interpolation indicated in Formula (5) above, Doppler distortion is canceled at the listening point P11, and high-quality sound is observed.

For example, generating a corrected audio signal through the Doppler distortion correction of the present technique from the input audio signal constituted by a low frequency sine wave signal having a frequency $f_1$ and a high-frequency sine wave signal having a frequency $f_2$, as described with reference to FIG. 3, and playing back the generated signal through the speaker 13, results in the situation illustrated in FIG. 15. Note that in FIG. 15, the vertical axis represents the amplitude of the signal, and the horizontal axis represents the frequency.

Figure 15:
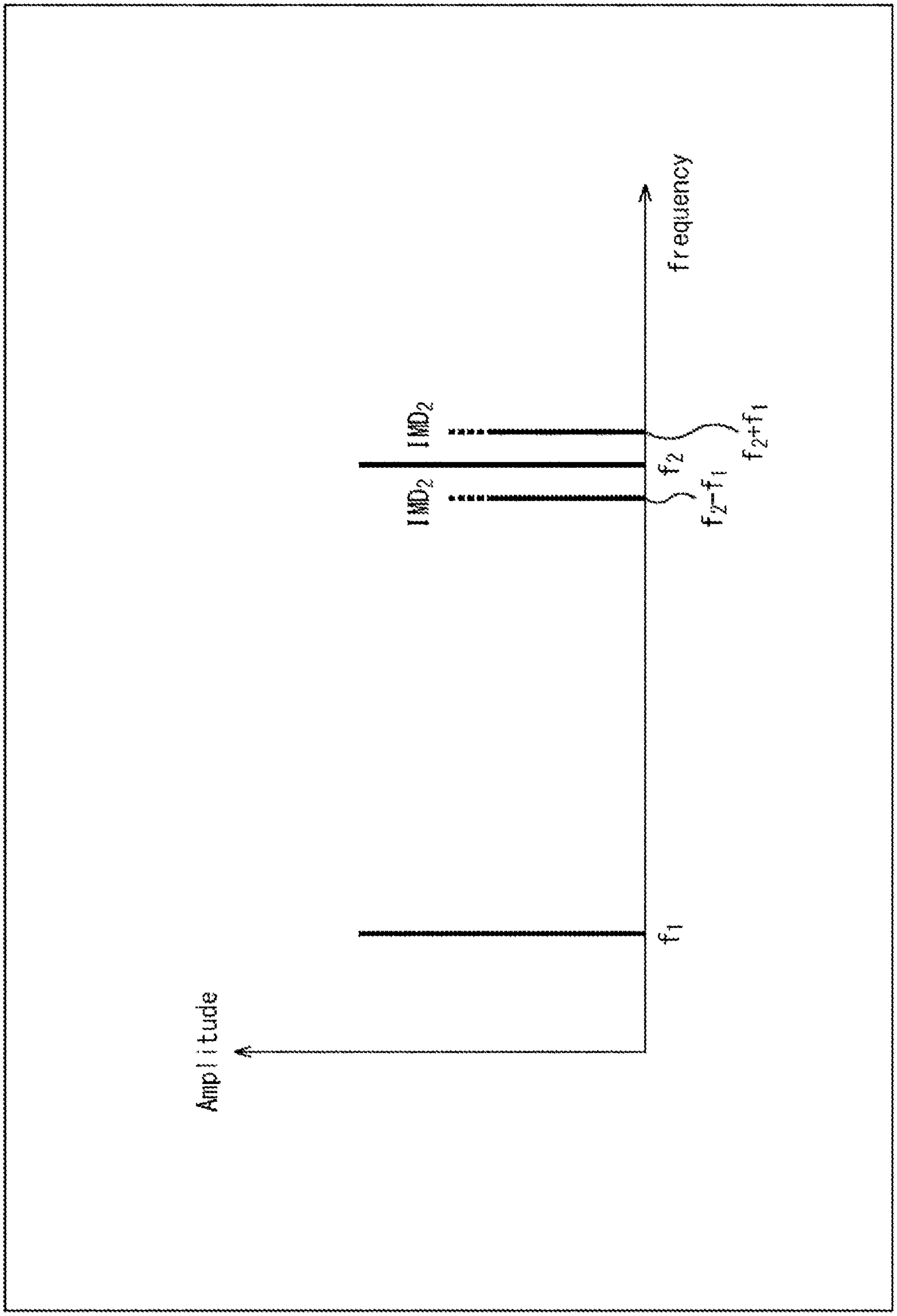
FIG. 15 is a diagram illustrating an effect of Doppler distortion correction.

FIG. 15 illustrates each of frequency components of an audio signal obtained by using a microphone to collect (measure) sound played back by the speaker 13 based on the corrected audio signal obtained from the Doppler distortion correction of the present technique at the listening point P11.

In this example, similar to FIG. 3, components of the frequency $f_1$ and the frequency $f_2$ contained in the original input audio signal, as well as components of a frequency ($f_2$−$f_1$) and a frequency ($f_2$+$f_1$), which are side bands of the frequency $f_2$, are included.

In particular, in FIG. 15, the dotted line parts of the components of the frequency ($f_2$−$f_1$) and the frequency ($f_2$+$f_1$) indicate Doppler distortion reduced by performing the Doppler distortion correction. In other words, these dotted line parts indicate the difference in Doppler distortion between when the Doppler distortion correction is performed and when the Doppler distortion correction is not performed (the case illustrated in FIG. 3).

Performing Doppler distortion correction in this manner makes it possible to suppress Doppler distortion and realize higher quality sound playback.

<Example of Configuration of Doppler Distortion Correction Unit>

Figure 16:
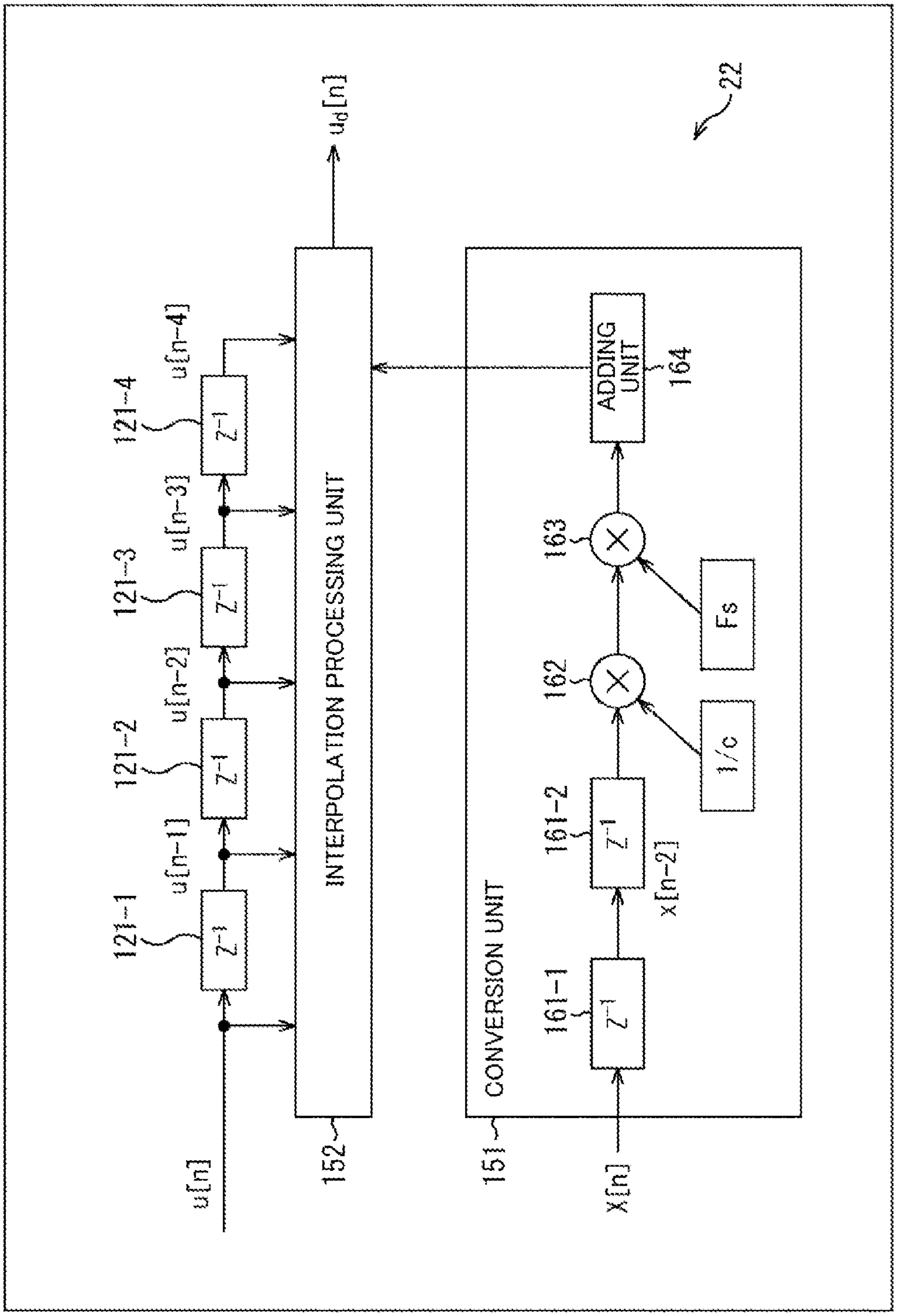
FIG. 16 is a diagram illustrating an example of the configuration of a Doppler distortion correction unit.

When the Doppler distortion correction described in the foregoing is performed, the Doppler distortion correction unit 22 of the signal processing device 11 is configured as illustrated in FIG. 16, for example. Note that in FIG. 16, parts corresponding to those in FIG. 14 are indicated by the same reference signs, and descriptions of those parts will be omitted as appropriate.

In the example illustrated in FIG. 16, the Doppler distortion correction unit 22 includes the delay units 121-1 to 121-4, a conversion unit 151, and an interpolation processing unit 152.

The conversion unit 151 converts the displacement x [n] supplied from the filter unit 32 of the speaker displacement prediction unit 21 into a correction sample number x in sample units corresponding to that displacement x [n], and supplies the correction sample number x to the interpolation processing unit 152.

The conversion unit 151 includes a delay unit 161-1, a delay unit 161-2, a multiplication unit 162, a multiplication unit 163, and an adding unit 164.

The delay unit 161-1 delays the displacement x [n] supplied from the filter unit 32 by a time equivalent to one sample, and supplies the resulting displacement to the delay unit 161-2. The delay unit 161-2 delays the displacement x [n] supplied from the delay unit 161-1 by a time equivalent to one sample, and supplies the resulting displacement to the multiplication unit 162.

Note that when there is no particular need to distinguish between the delay unit 161-1 and the delay unit 161-2, these delay units may also be called simply "delay units 161" hereinafter.

The multiplication unit 162 multiplies the displacement x [n] supplied from the delay unit 161-2 by an inverse 1/c of the acoustic velocity c=340 [m/s], and supplies a correction time corresponding to the displacement x [n] obtained as a result to the multiplication unit 163. In other words, in the multiplication unit 162, the correction time is calculated by dividing the displacement x [n] by the acoustic velocity c.

The multiplication unit 163 multiplies the correction time supplied from the multiplication unit 162 by the sampling frequency Fs of the input audio signal, and supplies the correction sample number, which is the correction time in sample units including values lower than the decimal point, to the adding unit 164.

The adding unit 164 obtains a final correction sample number x by adding the offset sample number to the correction sample number supplied from the multiplication unit 163, and supplies the result to the interpolation processing unit 152. For example, in this example, a number of samples of 2 is added as the offset to the correction sample number supplied from the multiplication unit 163, and the result is taken as the correction sample number x.

The interpolation processing unit 152 performs interpolation processing based on the input audio signal u [n] input, the input audio signals u [n−1] to u [n−4] supplied from the respective delay units 121, and the correction sample number x supplied from the adding unit 164, and generates a corrected audio signal $u_d$ [n].

For example, the interpolation processing unit 152 performs Lagrange interpolation through the calculation indicated by Formula (5) above. The interpolation processing unit 152 supplies the corrected audio signal ua [n] obtained through the interpolation processing to the amplifier unit 12.

<Playback Processing>

Figure 17:
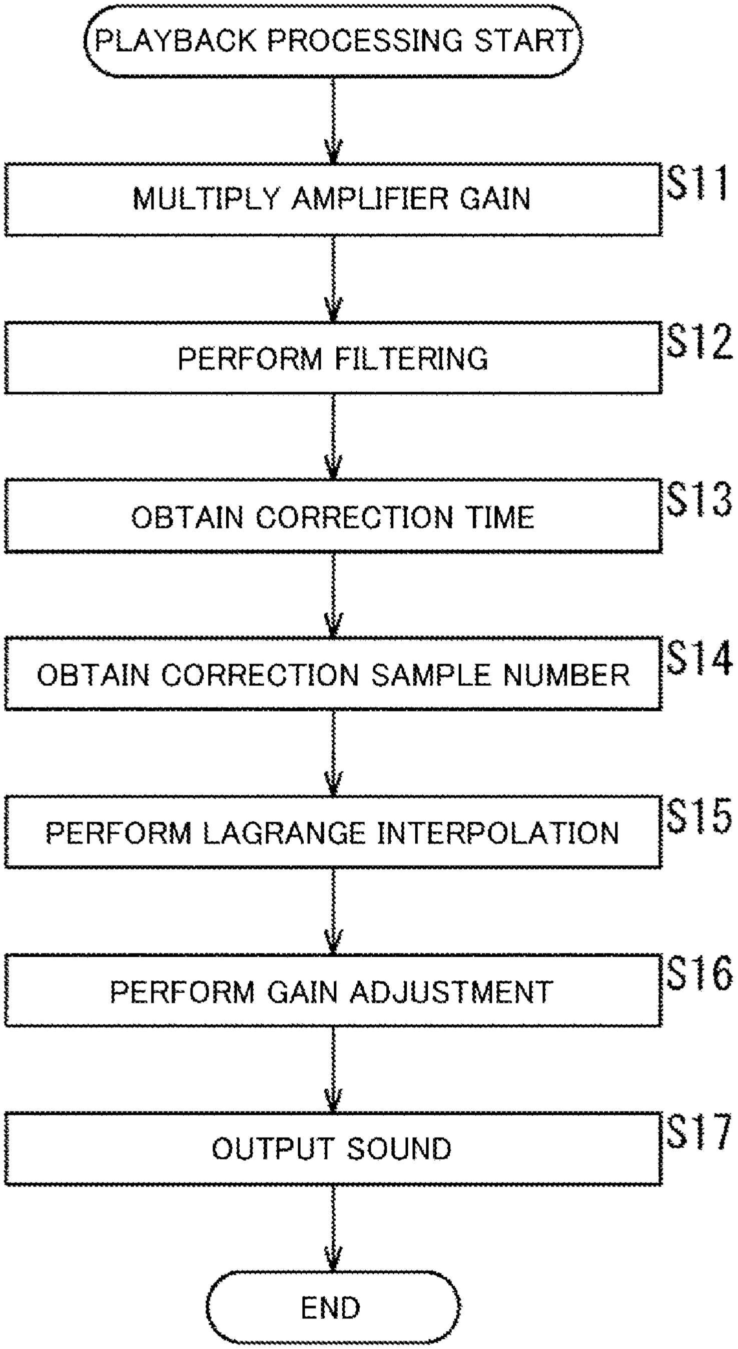
FIG. 17 is a flowchart illustrating playback processing.

Operations of the audio playback system illustrated in FIG. 4 will be described next. In other words, playback processing performed by the audio playback system will be described hereinafter with reference to the flowchart in FIG. 17. This playback processing is started when the input audio signal, which is a source signal, is input, and an instruction is made to play back the sound of content or the like.

In step S11, the amplifier unit 31 multiplies the supplied input audio signal u [n] by the amplifier gain in the amplifier unit 12, and supplies the resulting amplified input audio signal u [n] to the filter unit 32.

In step S12, the filter unit 32 performs filtering on the input audio signal u [n] supplied from the amplifier unit 31 using a third order IIR filter, and supplies the resulting displacement x [n] to the delay unit 161-1 of the conversion unit 151.

For example, in the filter unit 32, as described with reference to FIG. 11, the updating unit 91 calculates the above Formula (4) based on the displacement x [n−1] supplied from the adding unit 63, and calculates the force coefficient BL [n], the mechanical system compliance Cms [n], and the inductance Le [n].

Additionally, based on the TS parameters, which include the obtained force coefficient BL [n], mechanical system compliance Cms [n], and inductance Le [n], the updating unit 91 calculates the coefficients a0 to a3 and the coefficients b1 to b3, and supplies those coefficients to the amplifier units 61 and the amplifier units 65, respectively.

Furthermore, each of the delay units 62 and the delay units 64 delays the supplied signals by a time equivalent to one sample and outputs the resulting signals to the subsequent stages, the amplifier units 61 and amplifier units 65 multiply the supplied signals by the coefficients supplied from the updating unit 91, and the obtained signals are supplied to the adding unit 63.

The adding unit 63 adds the signals supplied from the amplifier units 61 and the amplifier units 65 and takes the result as the displacement x [n], and supplies that displacement x [n] to the updating unit 91 and the delay unit 161-1.

Upon doing so, the delay unit 161-1 delays the displacement x [n] supplied from the adding unit 63 and supplies that displacement x [n] to the delay unit 161-2, and the delay unit 161-2 delays the displacement x [n] supplied from the delay unit 161-1 and supplies that displacement x [n] to the multiplication unit 162.

This filtering in the filter unit 32 results in non-linear prediction of the displacement x [n] being performed.

In step S13, the multiplication unit 162 obtains the correction time by multiplying the displacement x [n] supplied from the delay unit 161-2 by the inverse 1/c of the acoustic velocity c, and supplies the obtained correction time to the multiplication unit 163.

In step S14, the multiplication unit 163 obtains the correction sample number by multiplying the correction time supplied from the multiplication unit 162 by the sampling frequency Fs, and supplies the correction sample number to the adding unit 164. Additionally, the adding unit 164 obtains a final correction sample number x by adding the offset sample number to the correction sample number supplied from the multiplication unit 163, and supplies the result to the interpolation processing unit 152.

Furthermore, each of the delay units 121 delays the supplied input audio signal and supplies the resulting signal to the delay units 121, the interpolation processing unit 152, and the like in subsequent stages.

In step S15, the interpolation processing unit 152 performs Lagrange interpolation based on the input audio signal u [n] input, the input audio signals u [n−1] to u [n−4] supplied from the respective delay units 121, and the correction sample number x supplied from the adding unit 164.

In other words, the interpolation processing unit 152 performs Lagrange interpolation by calculating the above Formula (5), and supplies the corrected audio signal $u_d$ [n] obtained as a result to the amplifier unit 12.

In step S16, the amplifier unit 12 performs gain adjustment by multiplying the corrected audio signal $u_d$ [n] supplied from the interpolation processing unit 152 by the amplifier gain, and supplies the gain-adjusted corrected audio signal $u_d$ [n] to the speaker 13.

In step S17, the speaker 13 outputs sound by driving based on the corrected audio signal $u_d$ [n] supplied from the amplifier unit 12, after which the playback processing ends.

In the audio playback system, the processing described above is performed for each sample of the input audio signal.

In this manner, the audio playback system obtains the displacement x [n] through non-linear prediction, and obtains the corrected audio signal $u_d$ [n] by performing Lagrange interpolation using a polynomial expression of the second order or higher based on the correction sample number x corresponding to that displacement x [n]. By doing so, Doppler distortion can be reduced more, and high-quality sound playback can be realized.

Although the foregoing describes an example in which the speaker system, i.e., the speaker 13, is a sealed type, the type is not limited thereto, and the present technique can be applied to any speaker, such as a bass reflex type, a passive radiator type, or the like.

Figure 18:
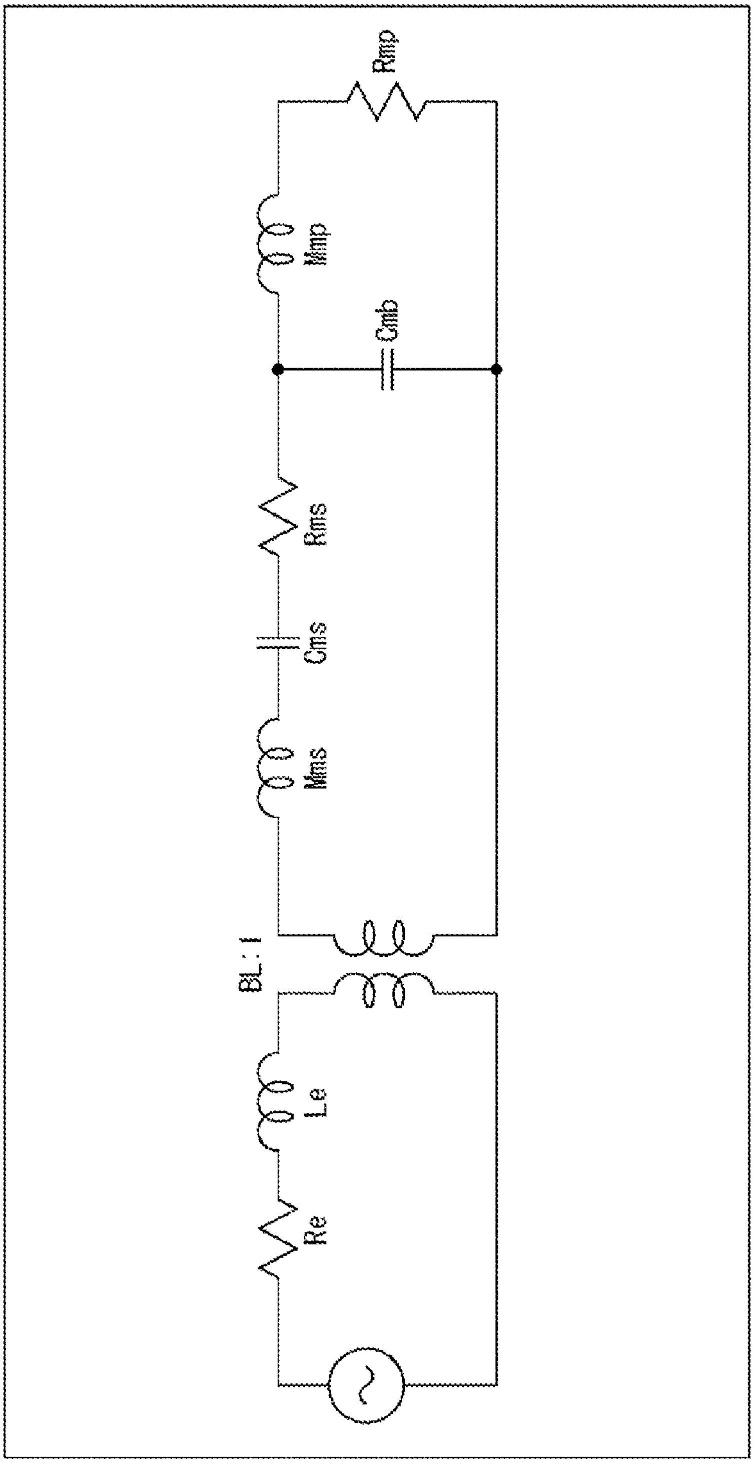
FIG. 18 is a diagram illustrating an example of an equivalent circuit of a speaker.

For example, if the speaker 13 is a bass reflex speaker, the equivalent circuit of that speaker 13 is as illustrated in FIG. 18.

In the example in FIG. 18, the circuit on the left side of the drawing indicates the equivalent circuit of the electrical system, and the right side of the drawing indicates the equivalent circuit of the mechanical system. Each letter in FIG. 18 indicates each parameter, called the "TS parameters", and these TS parameters are similar to those illustrated in FIG. 6.

Figure 19:
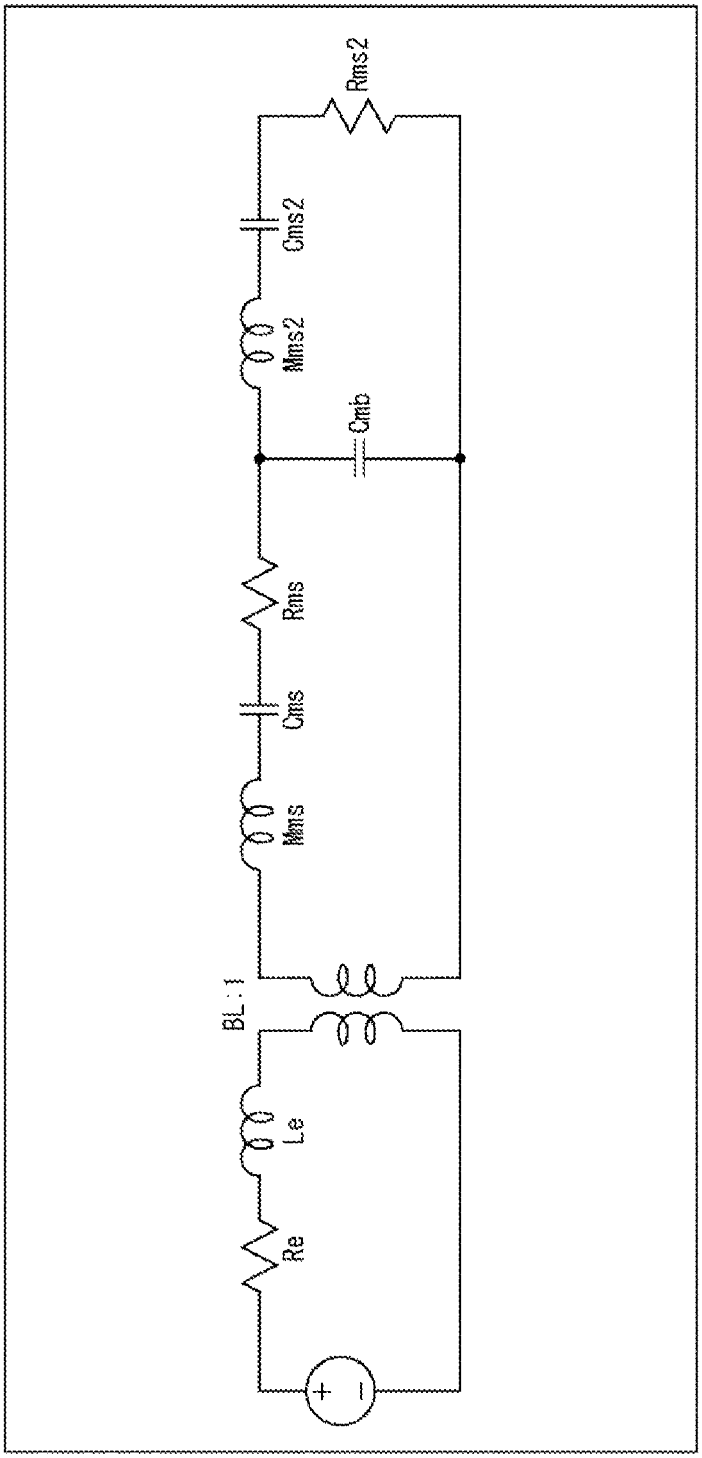
FIG. 19 is a diagram illustrating an example of an equivalent circuit of a speaker.

Additionally, for example, if the speaker 13 is a passive radiator speaker, the equivalent circuit of that speaker 13 is as illustrated in FIG. 19.

In the example in FIG. 19, the circuit on the left side of the drawing indicates the equivalent circuit of the electrical system, and the right side of the drawing indicates the equivalent circuit of the mechanical system. Each letter in FIG. 19 indicates each parameter, called the "TS parameters", and these TS parameters are similar to those illustrated in FIG. 6.

In the examples illustrated in FIGS. 18 and 19 as well, the displacement x [n] can be obtained through non-linear prediction if a filter for displacement prediction, obtained by performing digital filtering based on the equivalent circuit of the speaker 13, is used.

Second Embodiment

<Example of Configuration of Audio Playback System>

Furthermore, although the foregoing describes an example in which the input audio signal, which is a source signal, is input to the speaker displacement prediction unit 21 as illustrated in FIG. 4, the corrected audio signal after the Doppler distortion correction may be input instead.

Figure 20:
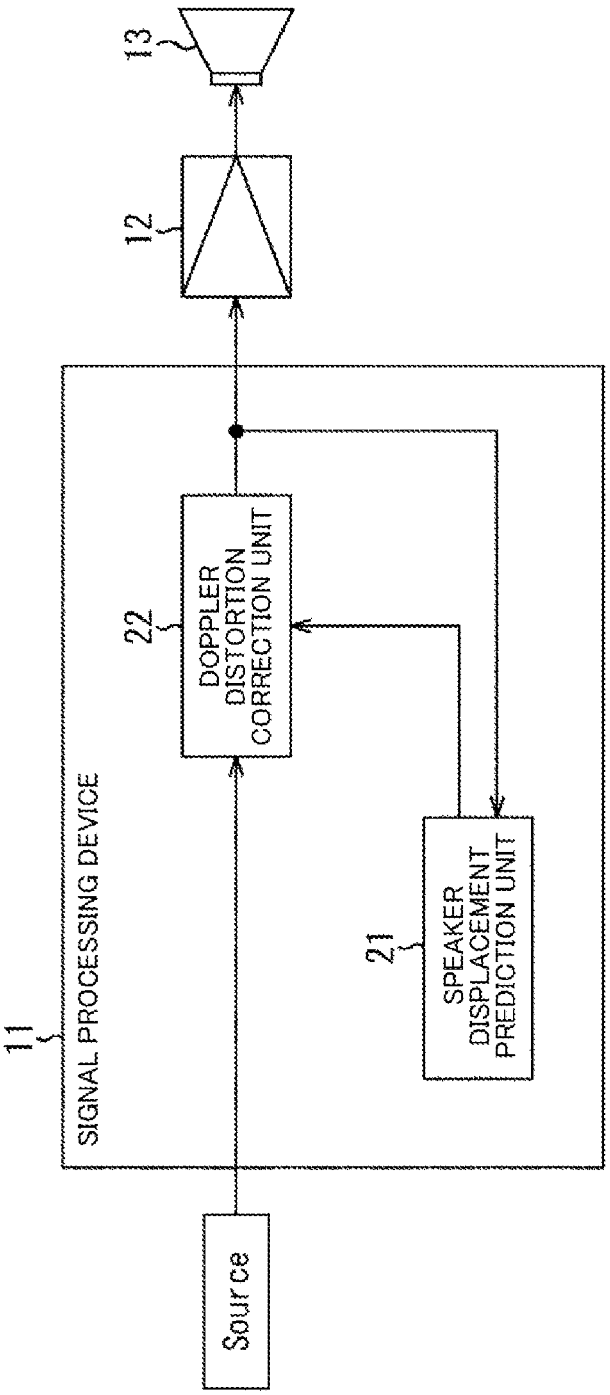
FIG. 20 is a diagram illustrating an example of the configuration of an audio playback system.

In such a case, the audio playback system is configured as illustrated in FIG. 20. Note that in FIG. 20, parts corresponding to those in FIG. 4 are indicated by the same reference signs, and descriptions of those parts will be omitted as appropriate.

The audio playback system illustrated in FIG. 20 includes the signal processing device 11, the amplifier unit 12, and the speaker 13, and the signal processing device 11 includes the speaker displacement prediction unit 21 and the Doppler distortion correction unit 22.

Additionally, although not illustrated, the speaker displacement prediction unit 21 includes the amplifier unit 31 and the filter unit 32, and the Doppler distortion correction unit 22 includes the delay units 121-1 to 121-4, the conversion unit 151, and the interpolation processing unit 152.

This audio playback system differs from the audio playback system illustrated in FIG. 4 in that the corrected audio signal output from the Doppler distortion correction unit 22 is input to the speaker displacement prediction unit 21, and is the same as the audio playback system illustrated in FIG. 4 in other respects.

Accordingly, with the audio playback system illustrated in FIG. 20, the amplifier unit 31 of the speaker displacement prediction unit 21 amplifies the corrected audio signal supplied from the interpolation processing unit 152 of the Doppler distortion correction unit 22 using the amplifier gain in the amplifier unit 12, and supplies the resulting signal to the filter unit 32.

The filter unit 32 performs non-linear prediction by filtering the corrected audio signal supplied from the amplifier unit 31, and supplies a displacement obtained as a prediction result to the conversion unit 151 of the Doppler distortion correction unit 22, and more specifically, to the delay unit 161-1 of the conversion unit 151.

In this manner, even when the configuration illustrated in FIG. 20 is used, Doppler distortion can be reduced and high-quality sound playback can be realized, similar to the case illustrated in FIG. 4.

Although the foregoing first embodiment and second embodiment describe examples in which the speaker 13 is a full-range speaker, the present technique can also be applied to multi-way mid-range speakers, woofers, and the like.

For example, when the speaker 13 is a multi-way mid-range speaker, woofer, or the like, and a bandwidth dividing filter has moderate characteristics such as 12 dB/Oct, high frequencies that are affected by Doppler distortion are also played back, although to a lesser extent. Accordingly, by applying the present technique and performing Doppler distortion correction, the quality of sound radiated from the multi-way speaker or the like can be improved.

<Example of Configuration of Computer>

Incidentally, the above-described series of processing can also be executed by hardware or software. When the series of processing is executed by software, a program constituting the software is installed in a computer. Here, the computer includes, for example, a computer incorporated into dedicated hardware, a general-purpose personal computer in which various programs are installed such that the computer can execute various functions, and the like.

Figure 21:
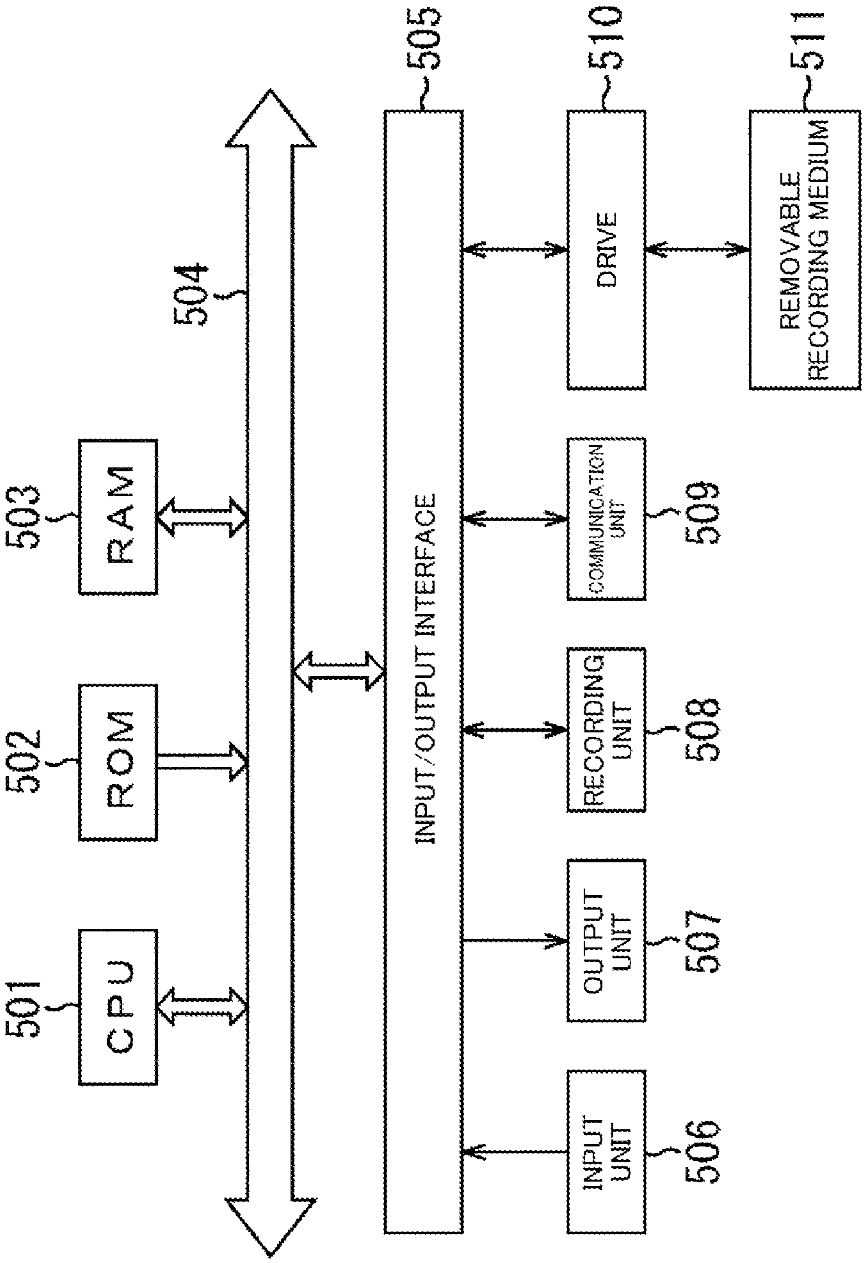
FIG. 21 is a diagram illustrating an example of the configuration of a computer.

FIG. 21 is a block diagram illustrating an example of the configuration of hardware of a computer that uses a program to execute the above-described series of processing.

In the computer, a central processing unit (CPU) 501, read-only memory (ROM) 502, and random access memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 is a keyboard, a mouse, a microphone, an image sensor, or the like. The output unit 507 is a display, a speaker, or the like. The recording unit 508 is constituted of a hard disk, non-volatile memory, or the like. The communication unit 509 is a network interface or the like. The drive 510 drives a removable recording medium 511 such as a magnetic disk, an optical disc, a magneto-optical disk, semiconductor memory, or the like.

In the computer configured as described above, for example, the above-described series of processing is performed by the CPU 501 loading a program recorded in the recording unit 508 into the RAM 503 through the input/output interface 505 and the bus 504 and executing the program.

The program executed by the computer (the CPU 501) can be recorded on, for example, the removable recording medium 511, as a packaged medium, and provided in such a state. The program can also be provided over a wired or wireless transmission medium such as a local area network, the Internet, or digital satellite broadcasting.

In the computer, the program can be installed in the recording unit 508 through the input/output interface 505 by mounting the removable recording medium 511 in the drive 510. Furthermore, the program can be received by the communication unit 509 over a wired or wireless transfer medium and installed in the recording unit 508. In addition, this program may be installed in advance in the ROM 502 or the recording unit 508.

Note that the program executed by the computer may be a program in which the processing is performed chronologically in the order described in the present specification, or may be a program in which the processing is performed in parallel or at a necessary timing such as when called.

Additionally, the embodiments of the present technique are not limited to the above-described embodiments, and various modifications can be made without departing from the essential spirit of the present technique.

For example, the present technique may be configured as cloud computing in which a plurality of devices share and cooperatively process one function over a network.

In addition, each step described with reference to the foregoing flowcharts can be executed by a single device, or in a shared manner by a plurality of devices.

Furthermore, when a single step includes a plurality of processes, the plurality of processes included in the single step can be executed by a single device, or in a shared manner by a plurality of devices.

Furthermore, the present technique can also be configured as follows.

(1) A signal processing device, including:

a displacement prediction unit that predicts displacement of a diaphragm of a speaker, in a case where the speaker plays back sound based on an audio signal in which a high frequency signal and a low frequency signal are mixed, based on the audio signal; and a correction unit that performs time direction correction on the audio signal by performing interpolation processing using at least three samples of the audio signal, based on the displacement obtained from the predicting and a correction time obtained based on an acoustic velocity.

(2) The signal processing device according to (1), wherein the displacement prediction unit finds the displacement through non-linear prediction.

(3) The signal processing device according to (2), wherein the displacement prediction unit performs the non-linear prediction using polynomial approximation.

(4) The signal processing device according to any one of (1) to (3), wherein the correction time is a delay time of the audio signal, the correction time increases when the diaphragm moves forward, and the correction time decreases when the diaphragm moves backward.

(5) The signal processing device according to any one of (1) to (4), wherein the correction unit calculates a number of samples of the correction time based on the displacement obtained from the predicting, the acoustic velocity, and a sampling frequency of the audio signal, and performs the interpolation processing based on the number of samples.

(6) The signal processing device according to (5), wherein the correction unit calculates the number of samples including a value below the decimal point.

(7) The signal processing device according to any one of (1) to (6), wherein the correction unit performs the time direction correction by correcting a sample value of the audio signal through the interpolation processing.

(8) The signal processing device according to any one of (1) to (7), wherein the interpolation processing is Lagrange interpolation, Newton's interpolation, or spline interpolation.

(9) The signal processing device according to any one of (1) to (8), wherein the displacement prediction unit predicts the displacement based on an audio signal obtained through the interpolation processing.

(10) A signal processing method, including:

a signal processing device performing the following:

predicting displacement of a diaphragm of a speaker, in a case where the speaker plays back sound based on an audio signal in which a high-frequency signal and a low frequency signal are mixed, based on the audio signal; and performing time direction correction on the audio signal by performing interpolation processing using at least three samples of the audio signal, based on the displacement obtained from the predicting and a correction time obtained based on an acoustic velocity.

(11) A program that causes a computer to perform processing including the steps of:

predicting displacement of a diaphragm of a speaker, in a case where the speaker plays back sound based on an audio signal in which a high-frequency signal and a low-frequency signal are mixed, based on the audio signal; and performing time direction correction on the audio signal by performing interpolation processing using at least three samples of the audio signal, based on the displacement obtained from the predicting and a correction time obtained based on an acoustic velocity.

REFERENCE SIGNS LIST

11 Signal processing device
12 Amplifier unit
13 Speaker
21 Speaker displacement prediction unit
22 Doppler distortion correction unit
31 Amplifier unit
32 Filter unit
151 Conversion unit
152 Interpolation processing unit

The invention claimed is:

1. A signal processing device, comprising:

a displacement prediction unit configured to predict a displacement of a diaphragm of a speaker based on an audio signal, wherein the audio signal includes a high frequency signal and a low frequency signal, and the speaker plays back a sound based on the audio signal;

a conversion unit configured to determine a correction time based on the predicted displacement and an acoustic velocity associated with the audio signal; and a correction unit configured to correct the audio signal based on the determined correction time and an interpolation process, wherein the interpolation process is based on at least three samples of the audio signal.

2. The signal processing device according to claim 1, wherein the displacement prediction unit is further configured to predict the displacement based on a non-linear prediction.

3. The signal processing device according to claim 2, wherein the non-linear prediction is based on a polynomial approximation.

4. The signal processing device according to claim 1, wherein
the correction time is a delay time of the audio signal,
the correction time increases based on a forward movement of the diaphragm in a direction towards a listening point, and
the correction time decreases based on a backward movement of the diaphragm in a direction opposite to the listening point.

5. The signal processing device according to claim 1, wherein
the correction unit is further configured to calculate a number of samples of the correction time based on the determined correction time and a sampling frequency of the audio signal, and
the interpolation process is based on the number of samples.

6. The signal processing device according to claim 5, wherein the number of samples includes a value below a decimal point.

7. The signal processing device according to claim 1, wherein the correction unit is further configured to correct a sample value of the audio signal based on the interpolation process.

8. The signal processing device according to claim 1, wherein the interpolation process is one of Lagrange interpolation, Newton's interpolation, or spline interpolation.

9. The signal processing device according to claim 1, wherein the audio signal is based on the interpolation process.

10. A signal processing method, comprising:
predicting displacement of a diaphragm of a speaker based on an audio signal, wherein
the audio signal includes a high frequency signal and a low frequency signal, and
the speaker plays back a sound based on the audio signal;
determining a correction time based on the predicted displacement and an acoustic velocity associated with the audio signal; and
correcting the audio signal based on the determined correction time and an interpolation process, wherein
the interpolation process is based on at least three samples of the audio signal.

11. A non-transitory computer-readable medium having stored thereon, computer-executable instructions which, when executed by a computer, cause the computer to execute operations, the operations comprising:
predicting displacement of a diaphragm of a speaker based on an audio signal, wherein
the audio signal includes a high frequency signal and a low frequency signal, and
the speaker plays back a sound based on the audio signal;
determining a correction time based on the predicted displacement and an acoustic velocity associated with the audio signal; and
correcting the audio signal based on the determined correction time and an interpolation process, wherein
the interpolation process is based on at least three samples of the audio signal.

* * * * *